(12) United States Patent
Joern et al.

(10) Patent No.: US 12,546,768 B2
(45) Date of Patent: Feb. 10, 2026

(54) ASSAY SYSTEM CALIBRATION SYSTEMS AND METHODS

(71) Applicant: MESO SCALE TECHNOLOGIES, LLC., Rockville, MD (US)

(72) Inventors: John Joern, Rockville, MD (US); George Sigal, Rockville, MD (US)

(73) Assignee: MESO SCALE TECHNOLOGIES, LLC., Rockville, MD (US)

( * ) Notice: Subject to any disclaimer, the term of this patent is extended or adjusted under 35 U.S.C. 154(b) by 904 days.

(21) Appl. No.: 17/572,280

(22) Filed: Jan. 10, 2022

(65) Prior Publication Data

US 2022/0221449 A1 Jul. 14, 2022

Related U.S. Application Data

(60) Provisional application No. 63/135,999, filed on Jan. 11, 2021.

(51) Int. Cl.
*G06F 17/18* (2006.01)
*G01N 33/543* (2006.01)

(52) U.S. Cl.
CPC .......... *G01N 33/543* (2013.01); *G06F 17/18* (2013.01)

(58) Field of Classification Search
CPC ...... G01N 33/543; G06F 17/18; G16C 20/70; G16C 20/90
See application file for complete search history.

(56) References Cited

U.S. PATENT DOCUMENTS

| | | | |
|---|---|---|---|
| 6,188,969 B1* | 2/2001 | Minor | G16C 20/70 702/22 |
| 6,795,785 B2* | 9/2004 | Mark | G06F 17/18 435/14 |
| 2019/0162739 A1* | 5/2019 | Holland | G01N 35/00693 |

FOREIGN PATENT DOCUMENTS

| | | | | |
|---|---|---|---|---|
| CA | 3147432 A1 * | 2/2021 | | G01N 33/68 |
| JP | 2017-106733 A | 6/2017 | | |
| WO | WO-2017083310 A1 * | 5/2017 | | |

OTHER PUBLICATIONS

WO-2017083310-A1_translated (Year: 2017).*
CA-3147432-A1_translated (Year: 2021).*
Appropriate Calibration Curve Fitting in Ligand Binding Assays, AAPS Journal 2007; 9 (2) Article 29, https://www.aapsj.org, submitted Feb. 21, 2007 (Year: 2007).*
Findlay et al., "Appropriate calibration curve fitting in ligand binding assays", The AAPS Journal, Springer-Verlag, New York. 9(2):E260-E267. Jun. 29, 2007.

(Continued)

*Primary Examiner* — Natalie Huls
(74) *Attorney, Agent, or Firm* — MEDLER FERRO WOODHOUSE & MILLS PLLC

(57) ABSTRACT

Systems and methods for calibrating sample assays are provided. Systems may include assay devices and components for carrying out calibration and sample assays. Systems may further include processing components and storage units configured for receiving calibration information, determining calibration models and parameters, and applying calibration parameters to sample data. Systems may further include components for operating in a networked environment. Methods may include techniques and processes for carrying out calibration and sample assays, determining calibration models and parameters, and applying calibration parameters to sample data.

25 Claims, 19 Drawing Sheets

(56) References Cited

OTHER PUBLICATIONS

Xiang et al., "A Simple Approach to Determine a curve Fitting Model with a Correct Weighting Function for Calibration Curves in Quantitative Ligand Binding Assays", The AAPS Journal, Springer US, New York. 20(3):1-9. Mar. 13, 2018.

* cited by examiner

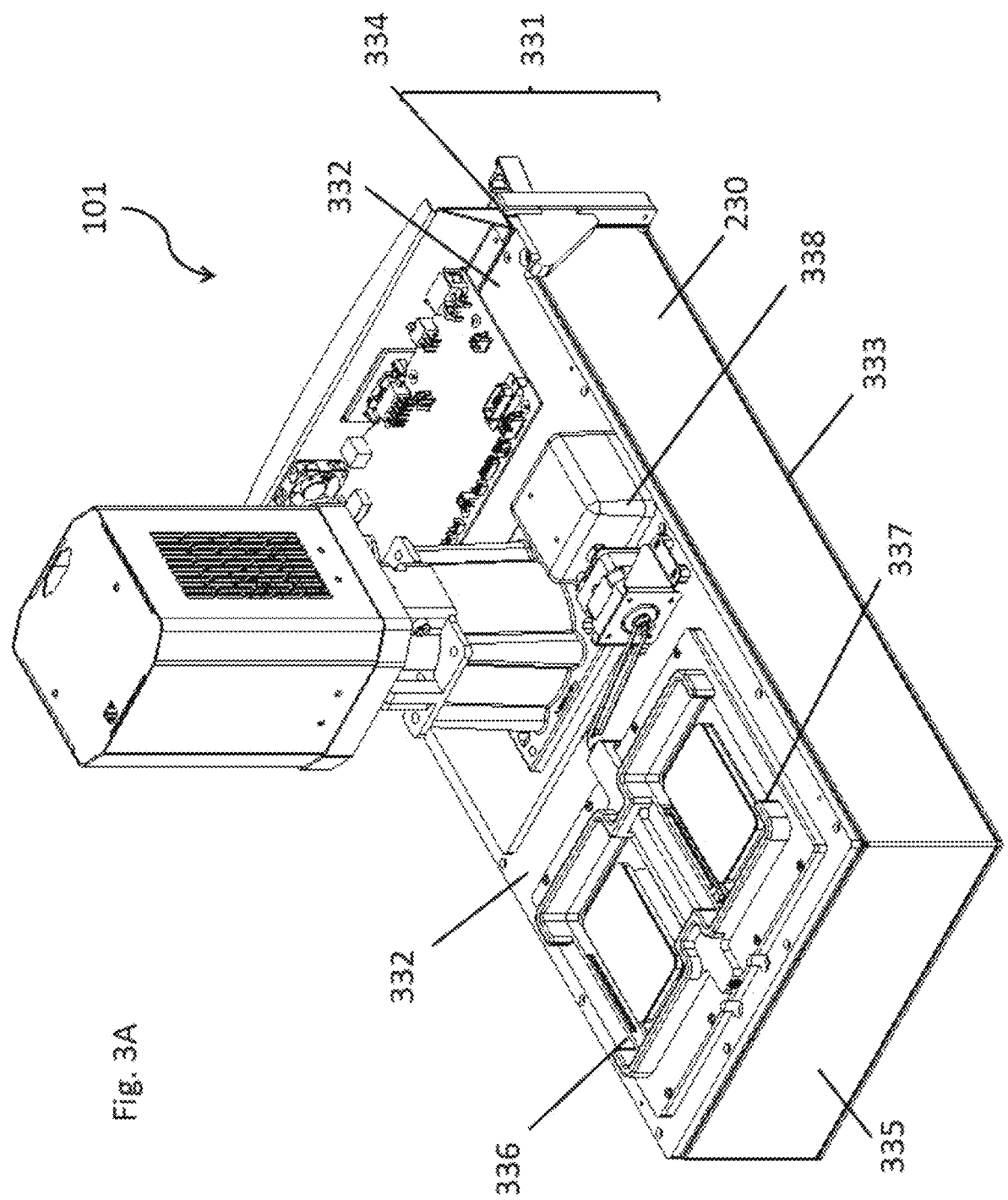

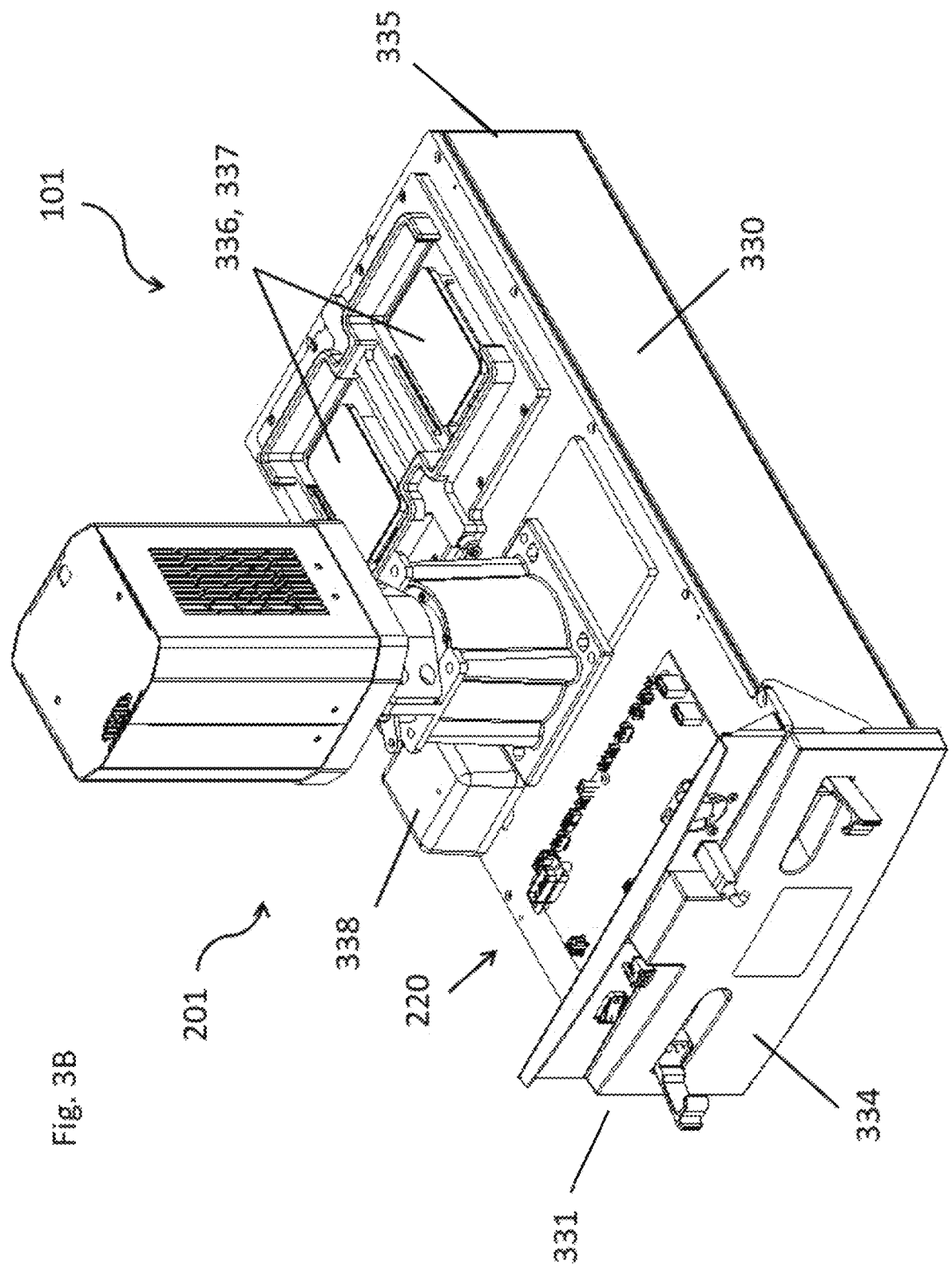

ASSAY SYSTEM CALIBRATION SYSTEMS AND METHODS

FIELD OF THE INVENTION

The present disclosure is related to methods of calibrating and employing assay systems and devices. In particular, the present disclosure relates to methods and systems employing improved calibration models.

BACKGROUND

A wide variety of assay devices and formats are available for conducting assays and assay measurements. Generating quantitative sample assay results based on assay signals may be obtained by calibrating the assay using appropriate calibrations standards. Embodiments described herein provide improved calibration models and techniques to generate sample assay results having improved accuracy.

SUMMARY

In embodiments, an assay calibration method is provided. The method includes performing, on an assay system, a plurality of calibration assays on a plurality of calibration samples having defined quantities of an analyte and including calibration samples having different quantities of the analyte to obtain a plurality of calibration assay signal values; generating, by at least one processing unit, a calibration data set including a plurality of quantity values according to the defined quantities and the plurality of calibration assay signal values corresponding to the plurality of calibration samples; selecting, by the at least one processing unit, a calibration model equation relating the defined quantities to the plurality of calibration assay signal values, wherein the calibration model equation is a modified four parameter logistic regression fit equation where a modified Hill's slope is dependent on a function of the quantity value, identifying, by the at least one processing unit, fitting parameters that fit the calibration model equation to the calibration data set, generating, by the at least one processing unit, a calibration model including the calibration model equation and the fitting parameters; performing, on the assay system, at least one sample assay on at least one test sample to obtain a sample assay signal value; generating, by the at least one processing unit, a sample assay data set including the at least one sample assay signal value; and obtaining, by the at least one processing unit, a sample quantity value determined according to the calibration model and the sample assay signal value.

In further embodiments, an assay system is provided. The assay system includes at least one memory unit; at least one processing unit programmed according to instructions on the at least one memory unit; and at least one assay system component configured to be controlled by the at least one processing unit. The at least one processing unit is configured to: control the at least one assay system component to perform a plurality of calibration assays on a plurality of calibration samples having defined quantities of an analyte and including calibration samples having different quantities of the analyte to obtain a plurality of calibration assay signal values; generate a calibration data set including a plurality of quantity values according to the defined quantities and the plurality of calibration assay signal values corresponding to the plurality of calibration samples; select a calibration model equation relating the defined quantities to the plurality of calibration assay signal values, wherein the calibration model equation is a modified four parameter logistic regression fit equation where a modified Hill's slope is dependent on a function of the quantity value; identify fitting parameters that fit the calibration model equation to the calibration data set; generate a calibration model including the calibration model equation and the fitting parameters; control the at least one assay system component to perform at least one sample assay on at least one test sample to obtain a sample assay signal value; generate a sample assay data set including the at least one sample assay signal value; and obtain a sample quantity value determined according to the calibration model and the sample assay signal value.

In still further embodiments, one or more non-transitory computer-readable media are provided. The one or more non-transitory computer-readable media have instructions stored thereon that, when executed by at least one processing unit, cause the at least one processing unit to: perform, via control of an assay system, a plurality of calibration assays on a plurality of calibration samples having defined quantities of an analyte and including calibration samples having different quantities of the analyte to obtain a plurality of calibration assay signal values; generate a calibration data set including a plurality of quantity values according to the defined quantities and the plurality of calibration assay signal values corresponding to the plurality of calibration samples; select a calibration model equation relating the defined quantities to the plurality of calibration assay signal values, wherein the calibration model equation is a modified four parameter logistic regression fit equation where a modified Hill's slope is dependent on a function of the quantity value; identify fitting parameters that fit the calibration model equation to the calibration data set; generate a calibration model including the calibration model equation and the fitting parameters; perform, via control of the assay system, at least one sample assay on at least one test sample to obtain a sample assay signal value; generate a sample assay data set including the at least one sample assay signal value; and obtain a sample quantity value determined according to the calibration model and the sample assay signal value.

In yet further embodiments, an assay calibration method is provided. The assay calibration method includes performing, on an assay system, a plurality of calibration assays on a plurality of calibration samples having defined quantities of an analyte and including calibration samples having different quantities of the analyte to obtain a plurality of calibration assay signal values; generating, by at least one processing unit, a calibration data set including a plurality of quantity values according to the defined quantities and the plurality of calibration assay signal values corresponding to the plurality of calibration samples; selecting, by the at least one processing unit, a calibration model equation relating the defined quantities to the plurality of calibration assay signal values, wherein the calibration model equation is a modified four parameter logistic regression fit equation where a modified Hill's slope is dependent on a function of the quantity value; identifying, by the at least one processing unit, fitting parameters that fit the calibration model equation to the calibration data set; generating, by the at least one processing unit, a calibration model including the calibration model equation and the fitting parameters; and storing, by the at least one processing unit, the calibration model.

In still further embodiments, an assay calibration method is provided. The assay calibration method includes obtaining, by at least one processing unit: a calibration model including a calibration model equation and fitting parameters, wherein the calibration model equation relates the defined quantities to the plurality of calibration assay signal values and is a modified four parameter logistic regression fit equation where a modified Hill's slope is dependent on a function of the quantity value, and the fitting parameters fit the calibration model equation to a calibration data set including a plurality of quantity values according to the defined quantities and the plurality of calibration assay signal values corresponding to the plurality of calibration samples; performing, on an assay system, at least one sample assay on at least one test sample to obtain a sample assay signal value; generating, by the at least one processing unit, a sample assay data set including the at least one sample assay signal value; and determining, by the at least one processing unit, a sample quantity value determined according to the calibration model and the sample assay signal value.

In yet further embodiments, one or more non-transitory computer-readable media are provided. The one or more non-transitory computer-readable media have instructions stored thereon that, when executed by at least one processing unit, cause the at least one processing unit to obtain a calibration data set including the results of assay measurements on a plurality of calibration samples having defined quantities of an analyte and including calibration samples having different quantities of the analyte, the calibration data set including a plurality of quantity values according to the defined quantities and the plurality of calibration assay signal values corresponding to the plurality of calibration samples; select a calibration model equation relating the defined quantities to the plurality of calibration assay signal values, wherein the calibration model equation is a modified four parameter logistic regression fit equation where a modified Hill's slope is dependent on a function of the quantity value; identify fitting parameters that fit the calibration model equation to the calibration data set; generate a calibration model including the calibration model equation and the fitting parameters; obtain a sample assay data set including the results of assay measurements on at least one test sample, the test data set including at least one sample assay signal value corresponding to the at least one test sample; and determine a sample quantity value according to the calibration model and the sample assay signal value.

In still further embodiments, a computer-implemented method to be carried out by a system including at least one memory unit and at least one processing unit programmed according to instructions on the at least one memory unit is provided. The method includes obtaining, by at least one processing unit: a calibration model including a calibration model equation and fitting parameters, wherein the calibration model equation relates the defined quantities to the plurality of calibration assay signal values and is modified four parameter logistic regression fit equation where a modified Hill's slope is dependent on a function of the quantity value, and the fitting parameters fit the calibration model equation to a calibration data set including a plurality of quantity values according to the defined quantities and the plurality of calibration assay signal values corresponding to the plurality of calibration samples; obtaining, by the at least one processing unit, a sample assay data set including the results of sample assay measurements on at least one test sample, the sample assay data set including at least one sample assay signal value corresponding to the at least one test sample; and determining, by the at least one processing unit, a sample quantity value according to according to the calibration model and the at least one sample assay signal value.

BRIEF DESCRIPTION OF THE FIGURES

FIGS. 3A-3C illustrate an assay device consistent with embodiments hereof.

DETAILED DESCRIPTION OF THE INVENTION

The present disclosure provides systems and computer implemented methods of calibrating assay systems and assay media and applying calibration models to sample assay data. As discussed herein, the calibration methods and techniques provide accurate calibration models for the calibration of assay systems and assay media using modified four parameter logistic fit regression equations. The calibration methods and techniques as discussed herein may be applied to various assay systems, devices, and media through the use of a comprehensive assay system environment.

The following disclosure includes discussion of obtained data, including multiple data points. In embodiments, multiple data points may be obtained according to similar parameters, procedures, methods, etc., and these multiple data points may be aggregated together, (e.g., as an average, weighted average, geometric average, median, etc.) as appropriate. In embodiments, aggregation of multiple data points may include filtering outlying data points, for example, highest, lowest, and/or extreme values. Although various portions of the disclosure may refer to a single method of aggregating multiple data points (e.g., averaging), a person of ordinary skill in the art will understand that additional or different aggregation techniques discussed herein may similarly be applied.

Figure 1:
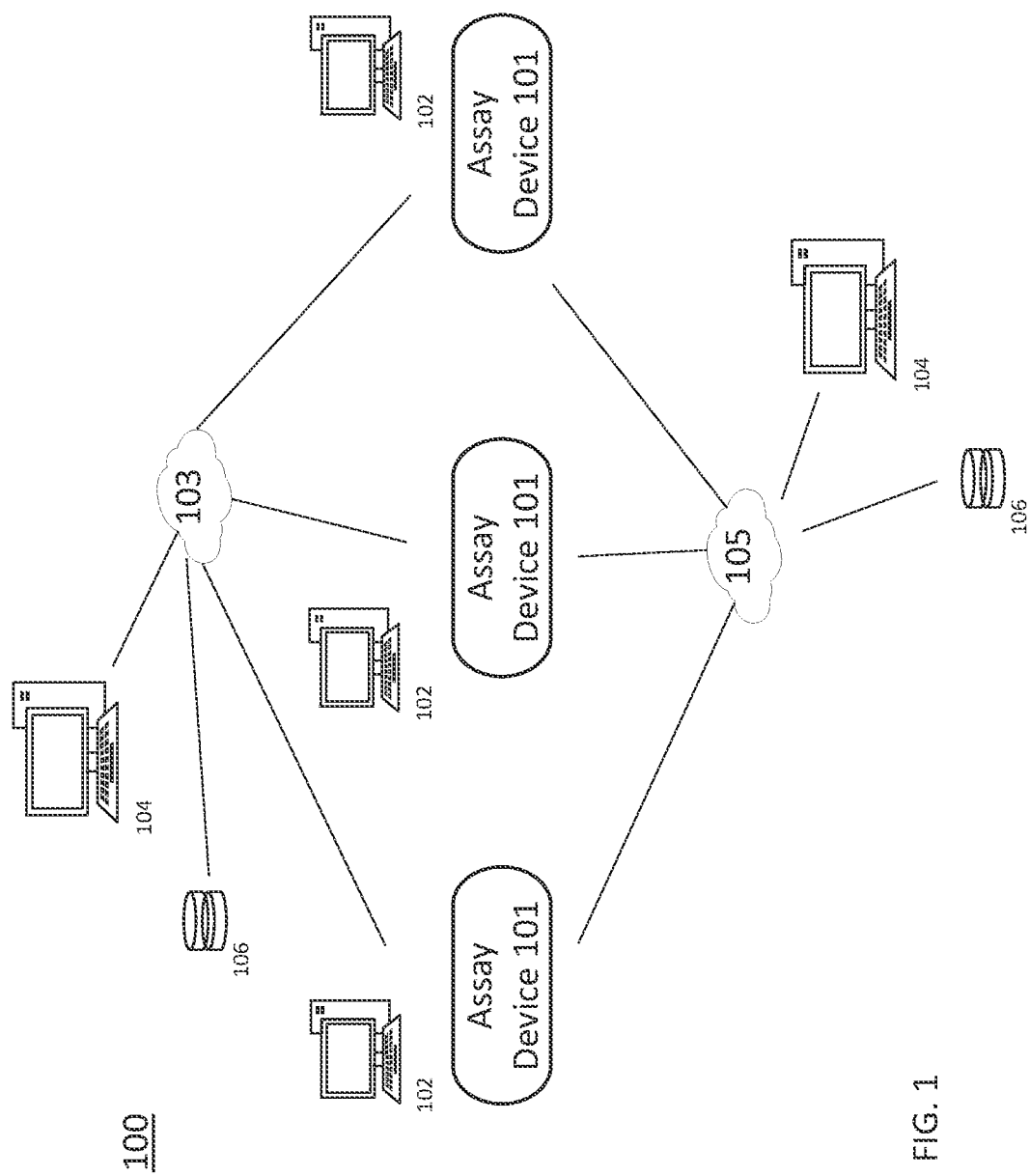
FIG. 1 illustrates an assay system environment consistent with embodiments hereof.

FIG. 1 illustrates an assay system environment 100 consistent with embodiments hereof. The assay system environment 100 includes one or more assay devices 101, one or more local assay computing systems 102, one or more data storage devices 106, and one or more networked computing systems 104. Further, the various devices of the system may be connected by a closed network 103 and/or an open network 105. As discussed herein, the various components of the assay system environment 100 may be connected through wired and/or wireless communication links. Components of the assay system environment, however, are not required to be connected through continuous communication links. The assay system environment 100 may include computing systems 102 and 104 and assay devices 101 (also referred to as assay systems) that are connected only intermittently. The assay system environment 100 may further include computing systems 102 and 104 and assay devices 101 that have no wired or wireless connection to other components in the assay system environment 100. In such cases, data transfer may be achieved, for example, via physical transfer of storage media.

Assay devices 101 consistent with the present disclosure include a variety of assay devices and/or formats. The assay devices may include various components (assay system components), e.g., assay modules, such as assay plates, cartridges, multi-well assay plates, reaction vessels, test tubes, cuvettes, flow cells, assay chips, lateral flow devices, etc., having assay reagents (which may include targeting agents or other binding reagents) added as the assay progresses or pre-loaded in the wells, chambers, or assay regions of the assay module. These devices may employ a variety of assay approaches for measuring the presence, amount or activity of a target analyte. These include, but are not limited to, binding assays measuring the binding of the target to specific binding partners, enzymatic assays measuring an enzymatic activity of the target or the chemical transformation of the target by an enzyme, chemical assays measuring a chemical reaction of the target, and assays measuring a physical property (such as light absorbance) of the target. Within each of these groups, a variety of assay formats are known and can be employed by the devices. For binding assays, formats that can be employed include, but are not limited to direct binding assays, sandwich binding assays and competitive binding assays. Binding assays may employ a variety of different classes of binding reagents including, but not limited to, antibodies (i.e., immunoassays), nucleic acids (i.e., hybridization assays), biological receptor/ligand pairs, haptens, and other reagents characterized by having an ability to bind or selectively bind a target analyte. Illustrative assay devices and formats are described herein below.

A wide variety of solid phases are suitable for use in binding assay methods of the present embodiments including conventional solid phases from the art of binding assays. Solid phases may be made from a variety of different materials including polymers (e.g., polystyrene and polypropylene), ceramics, glass, composite materials (e.g., carbon-polymer composites such as carbon-based inks). Suitable solid phases include the surfaces of macroscopic objects such as an interior surface of an assay container (e.g., test tubes, cuvettes, flow cells, cartridges, wells in a multi-well plate, etc.), slides, assay chips (such as those used in gene or protein chip measurements), pins or probes, beads, filtration media, lateral flow media (for example, filtration membranes used in lateral flow test strips), etc.

Suitable solid phases also include particles (including but not limited to colloids or beads) commonly used in other types of particle-based assays e.g., magnetic, polypropylene, and latex particles, materials typically used in solid-phase synthesis e.g., polystyrene and polyacrylamide particles, and materials typically used in chromatographic applications e.g., silica, alumina, polyacrylamide, polystyrene. The materials may also be a fiber such as a carbon fibril. Microparticles may be inanimate or alternatively, may include animate biological entities such as cells, viruses, bacterium and the like.

The particles used in the present method may be comprised of any material suitable for attachment to one or more binding partners and/or labels, and that may be collected via, e.g., centrifugation, gravity, filtration or magnetic collection. A wide variety of different types of particles that may be attached to binding reagents are sold commercially for use in binding assays. These include non-magnetic particles as well as particles comprising magnetizable materials which allow the particles to be collected with a magnetic field. In one embodiment, the particles are comprised of a conductive and/or semi conductive material, e.g., colloidal gold particles.

The microparticles may have a wide variety of sizes and shapes. By way of example and not limitation, microparticles may be between 5 nanometers and 100 micrometers. Preferably microparticles have sizes between 20 nm and 10 micrometers. The particles may be spherical, oblong, rod-like, etc., or they may be irregular in shape.

The particles used in the present method may be coded to allow for the identification of specific particles or subpopulations of particles in a mixture of particles. The use of such coded particles has been used to enable multiplexing of assays employing particles as solid phase supports for binding assays. In one approach, particles are manufactured to include one or more fluorescent dyes and specific populations of particles are identified based on the intensity and/or relative intensity of fluorescence emissions at one or more wave lengths. This approach has been used in the Luminex xMAP systems (see, e.g., U.S. Pat. No. 6,939,720) and the Becton Dickinson Cytometric Bead Array systems. Alternatively, particles may be coded through differences in other physical properties such as size, shape, imbedded optical patterns and the like.

The methods of embodiments can be used with a variety of methods for measuring the amount of an analyte and, in particular, measuring the amount of an analyte bound to a solid phase. Techniques that may be used include, but are not limited to, techniques known in the art such as cell culture-based assays, binding assays (including agglutination tests, immunoassays, nucleic acid hybridization assays, etc.), enzymatic assays, colorimetric assays, etc. Other suitable techniques will be readily apparent to one of ordinary skill in the art. Some measurement techniques allow for measurements to be made by visual inspection, others may require or benefit from the use of an instrument to conduct the measurement.

Methods for measuring the amount of an analyte include label free techniques, which include but are not limited to i) techniques that measure changes in mass or refractive index at a surface after binding of an analyte to a surface (e.g., surface acoustic wave techniques, surface plasmon resonance sensors, ellipsometric techniques, etc.), ii) mass spectrometric techniques (including techniques like MALDI, SELDI, etc. that can measure analytes on a surface), iii) chromatographic or electrophoretic techniques, and iv) fluorescence techniques (which may be based on the inherent fluorescence of an analyte), etc.

Methods for measuring the amount of an analyte also include techniques that measure analytes through the detection of labels which may be attached directly or indirectly (e.g., through the use of labeled binding partners of an analyte) to an analyte. Suitable labels include labels that can be directly visualized (e.g., particles that may be seen visually and labels that generate a measurable signal such as light scattering, optical absorbance, fluorescence, chemiluminescence, electrochemiluminescence, radioactivity, magnetic fields, etc.). Labels that may be used also include enzymes or other chemically reactive species that have a chemical activity that leads to a measurable signal such as light scattering, absorbance, fluorescence, etc. The use of enzymes as labels has been well established in in Enzyme-Linked ImmunoSorbent Assays, also called ELISAs, Enzyme ImmunoAssays or EIAs. In the ELISA format, an unknown amount of antigen is affixed to a surface and then a specific antibody is washed over the surface so that it can bind to the antigen. This antibody is linked to an enzyme, and in the final step a substance is added that the enzyme converts to a product that provides a change in a detectable signal. The formation of product may be detectable, e.g., due a difference, relative to the substrate, in a measurable property such as absorbance, fluorescence, chemiluminescence, light scattering, etc. Certain (but not all) measurement methods that may be used with solid phase binding methods according to the embodiments may benefit from or require a wash step to remove unbound components (e.g., labels) from the solid phase Accordingly, the methods of the embodiments may comprise such a wash step.

Assay methods disclosed herein may be performed manually, using automated technology, or both. Automated technology may be partially automated, e.g., one or more modular instruments, or a fully integrated, automated instrument. Example automated systems are discussed and described in commonly owned International Patent Appl. Pub. Nos. WO 2018/017156 and WO 2017/015636, International Patent Appl. Pub. No. WO 2016/164477, and International Patent Appl. Pub. No. WO 2021/231935, each of which is incorporated by reference herein in its entirety.

Assay devices 101 may include automated systems (modules and fully integrated) on which the methods herein may be carried out and may comprise the following automated subsystems: computer subsystem(s) that may comprise hardware (e.g., personal computer, laptop, hardware processor, disc, keyboard, display, printer), software (e.g., processes such as drivers, driver controllers, and data analyzers), and database(s); liquid handling subsystem(s), e.g., sample handling and reagent handling, e.g., robotic pipetting head, syringe, stirring apparatus, ultrasonic mixing apparatus, magnetic mixing apparatus; sample, reagent, and consumable storing and handling subsystem(s), e.g., robotic manipulator, tube or lid or foil piercing apparatus, lid removing apparatus, conveying apparatus such as linear and circular conveyors and robotic manipulators, tube racks, plate carriers, trough carriers, pipet tip carriers, plate shakers; centrifuges, assay reaction subsystem(s), e.g., fluid-based and consumable-based (such as tube and multi well plate); container and consumable washing subsystem(s), e.g., plate washing apparatus; magnetic separator or magnetic particle concentrator subsystem(s), e.g., flow cell, tube, and plate types; cell and particle detection, classification and separation subsystem(s), e.g., flow cytometers and Coulter counters; detection subsystem(s) such as colorimetric, nephelometric, fluorescence, and ECL detectors; temperature control subsystem(s), e.g., air handling, air cooling, air warming, fans, blowers, water baths; waste subsystem(s), e.g., liquid and solid waste containers; global unique identifier (GUI) detecting subsystem(s) e.g., 1D and 2D bar-code scanners such as flat bed and wand types; sample identifier detection subsystem(s), e.g., 1D and 2D bar-code scanners such as flat bed and wand types. Analytical subsystem(s), e.g., chromatography systems such as high-performance liquid chromatography (HPLC), fast-protein liquid chromatography (FPLC), and mass spectrometer can also be modules or fully integrated. Automated systems consistent with embodiments hereof may be controlled and/or managed by the user interface manager 622, as discussed below.

Systems or modules that perform sample identification and preparation may be combined with (or be adjoined to or adjacent to or robotically linked or coupled to) systems or modules that perform assays and that perform detection or that perform both. Multiple modular systems of the same kind may be combined to increase throughput. Modular system(s) may be combined with module(s) that carry out other types of analysis such as chemical, biochemical, and nucleic acid analysis.

Automated systems may allow batch, continuous, random-access, and point-of-care workflows and single, medium, and high sample throughput.

Automated systems consistent with embodiments hereof may include, for example, one or more of the following devices: plate sealer (e.g., Zymark), plate washer (e.g., BioTek, TECAN), reagent dispenser and/or automated pipetting station and/or liquid handling station (e.g., TECAN, Zymark, Labsystems, Beckman, Hamilton), incubator (e.g., Zymark), plate shaker (e.g., Q. Instruments, Inheco, Thermo Fisher Scientific), compound library or sample storage and/or compound and/or sample retrieval module. One or more of these devices may be coupled to the apparatus via a robotic assembly such that the entire assay process can be performed automatically. According to an alternate embodiment, containers (e.g., plates) are manually moved between the apparatus and various devices (e.g., stacks of plates).

The automated system may be configured to perform one or more of the following functions: (a) moving consumables such as plates into, within, and out of the detection subsystem, (b) moving consumables between other subsystems, (c) storing the consumables, (d) sample and reagent handling (e.g., adapted to mix reagents and/or introduce reagents into consumables), (e) consumable shaking (e.g., for mixing reagents and/or for increasing reaction rates), (f) consumable washing (e.g., washing plates and/or performing assay wash steps (e.g., well aspirating)), and (g) measuring an assay signal (for example, an ECL signal) in a flow cell or a consumable such as a tube or a plate. The automated system may be configured to handle individual tubes placed in racks, multiwell plates such as 96 or 384 well plates.

In embodiments, the automated system is fully automated, is modular, is computerized, performs in vitro quantitative and qualitative tests on a wide range of analytes and performs photometric assays, ion-selective electrode measurements, and/or electrochemiluminescence (ECL) assays. In embodiments, an automated system includes the following hardware units: a control unit, a core unit and at least one analytical module.

In embodiments, the control unit, which may be a local assay computing system 102 and/or a networked computing system 104, uses a graphical user interface to control all instrument functions, and is comprised of a readout device, such as a monitor, an input device(s), such as keyboard and mouse, and a personal computer using, e.g., a Windows operating system. In embodiments, the core unit is comprised of several components that manage conveyance of samples to each assigned analytical module. The actual composition of the core unit depends on the configuration of the analytical modules, which can be configured by one of skill in the art using methods known in the art. In embodiments, the core unit includes at least the sampling unit and one rack rotor as main components. Conveyor line(s) and a second rack rotor are possible extensions. Several other core unit components can include the sample rack loader/unloader, a port, a barcode reader (for racks and samples), a water supply and a system interface port. In embodiments, the analytical module conducts ECL assays and includes a reagent area, a measurement area, a consumables area and a pre-clean area.

The methods of the invention may be applied to single-plex or multiplex formats where multiple assay measurements are performed on a single sample. Multiplex measurements that can be used with the invention include, but are not limited to, multiplex measurements i) that involve the use of multiple sensors; ii) that use discrete assay domains on a surface (e.g., an array) that are distinguishable based on location on the surface; iii) that involve the use of reagents coated on particles that are distinguishable based on a particle property such as size, shape, color, etc.; iv) that produce assay signals that are distinguishable based on optical properties (e.g., absorbance or emission spectrum) that are based on temporal properties of assay signal (e.g., time, frequency or phase of a signal).

Embodiments disclosed herein include methods for detecting and counting individual detection complexes. In embodiments, the surface comprises a plurality of binding domains, and each analyte forms a complex in a different binding domain of the plurality of binding domains. In embodiments, the surface is a particle. In embodiments, the surface is a bead. In embodiments, the surface is a plate. In embodiments, the surface is a well in a multi-well array. In embodiments, the surface comprises an electrode. In embodiments, the electrode is a carbon ink electrode. In embodiments, each binding domain for each analyte of the one or more additional analytes is on a separate surface, and the surfaces are beads in a bead array. In embodiments, each binding domain for each analyte of the one or more additional analytes is on a single surface, and the binding domains form the elements of a capture reagent array on the surface. In embodiments, the surface comprises an electrode and the detection step of the method comprises applying a potential to the electrode and measuring electrochemiluminescence. In embodiments, applying a potential to the electrode generates an electrochemiluminescence signal.

In an embodiment, the surface comprises a plurality of capture reagents for one or more analytes that are present in a sample, and the plurality of capture reagents are distributed across a plurality of resolvable binding regions positioned on the surface. Under the conditions used to carry out and analyze a measurement, a "resolvable binding region" is the minimal surface area associated with an individual binding event that can be resolved and differentiated from another area in which an additional individual binding event is occurring. Therefore, the method consists of binding one or more analytes to one or more capture reagents on the surface, determining the presence or absence of the analytes, in a plurality of resolvable binding regions on the surface, and identifying the number of resolvable binding regions that contain an analyte of interest and/or the number of domains that do not contain analyte.

The resolvable binding regions can be optically interrogated, in whole or in part, i.e., each individual resolvable binding region can be individually optically interrogated and/or the entire surface comprising a plurality of resolvable binding regions can be imaged and one or more pixels or groupings of pixels within that image can be mapped to an individual resolvable binding region. A resolvable binding region may also be a microparticle within a plurality of microparticles. The resolvable binding regions exhibiting changes in their optical signature can be identified by a conventional optical detection system. Depending on the detected species (e.g., type of fluorescence entity, etc.) and the operative wavelengths, optical filters designed for a particular wavelength can be employed for optical interrogation of the resolvable binding regions. In embodiments where optical interrogation is used, the system can comprise more than one light source and/or a plurality of filters to adjust the wavelength and/or intensity of the light source. In some embodiments, the optical signal from a plurality of resolvable binding regions is captured using a CCD camera. Other non-limiting examples of camera imaging systems that can be used to capture images include charge injection devices (CIDs), complementary metal oxide semiconductors (CMOSs) devices, scientific CMOS (sCMOS) devices, and time delay integration (TDI) devices, as will be known to those of ordinary skill in the art. In some embodiments, a scanning mirror system coupled with a photodiode or photomultiplier tube (PMT) can be used for imaging.

In embodiments, the binding of each analyte to its corresponding capture reagent is performed in parallel by contacting the one or more surfaces with a single liquid volume comprising a plurality of analytes. In embodiments, the plurality of analytes includes the analyte and one or more additional analytes. In embodiments, each step of the method is carried out for each analyte in parallel. In embodiments, the method is a simultaneous multiplexed assay. Multiplexed measurement of analytes on a surface are described herein; see also, e.g., U.S. Pat. Nos. 10,201,812; 7,842,246 and 6,977,722, incorporated by reference herein in their entireties.

In a specific embodiment, the methods of the invention can be used in a multiplexed format by binding a plurality of different analytes to a plurality of capture reagents for those analytes, the capture analytes being immobilized on coded bead, such that the coding identifies the capture reagent (and analyte target) for a specific bead. The method may further comprise counting the number of beads that have a bound analyte (using the detection approaches described herein).

Alternatively or additionally, the capture reagents can be bound, directly or indirectly, to different discrete binding domains on one or more solid phases, e.g., as in a binding array wherein the binding domains are individual array elements, or in a set of beads wherein the binding domains are the individual beads, such that discrete assay signals are generated on and measured from each binding domain. If capture reagents for different analytes are immobilized in different binding domains, the different analytes bound to those domains can be measured independently. In one example of such an embodiment, the binding domains are prepared by immobilizing, on one or more surfaces, discrete domains of capture reagents that bind analytes of interest. Optionally, the surface(s) may define, in part, one or more boundaries of a container (e.g., a flow cell, well, cuvette, etc.) which holds the sample or through which the sample is passed. In a preferred embodiment, individual binding domains are formed on electrodes for use in electrochemical or electrochemiluminescence assays. Multiplexed measurement of analytes on a surface comprising a plurality of binding domains using electrochemiluminescence has been used in the Meso Scale Diagnostics, LLC, MULTI-ARRAY® and SECTOR® Imager line of products (see, e.g., U.S. Pat. Nos. 10,201,812; 7,842,246 and 6,977,722, incorporated herein by reference in their entireties).

Still further, the capture reagents can be bound, directly or indirectly, to an electrode surface, which optionally includes different discrete binding domains, as described above. The electrode surface can be a component of a multi-well plate and/or a flow cell. Electrodes can comprise a conductive material, e.g., a metal such as gold, silver, platinum, nickel, steel, iridium, copper, aluminum, a conductive allow, or the like. They may also include oxide coated metals, e.g., aluminum oxide coated aluminum. The electrode can include working and counter electrodes which can be made of the same or different materials, e.g., a metal counter electrode and carbon working electrode. In one specific embodiment, electrodes comprise carbon-based materials such as carbon, carbon black, graphitic carbon, carbon nanotubes, carbon fibrils, graphite, graphene, carbon fibers and mixtures thereof. In one embodiment, the electrodes comprise elemental carbon, e.g., graphitic, carbon black, carbon nanotubes, etc. Advantageously, they may include conducting carbon-polymer composites, conducting particles dispersed in a matrix (e.g., carbon inks, carbon pastes, metal inks, graphene inks), and/or conducting polymers. One specific embodiment of the invention is an assay module, preferably a multi-well plate, having electrodes (e.g., working and/or counter electrodes) that comprise carbon, e.g., carbon layers, and/or screen-printed layers of carbon inks.

In embodiments, each binding domain comprises a targeting reagent complement capable of binding to a targeting reagent complement and each anchoring reagent and capture reagent comprise a supplemental linking reagent capable of binding to a linking reagent, and the method further comprises immobilizing a capture reagent and anchoring agent in each binding domain by: (1) binding the capture and anchoring reagent through the supplemental linking reagent to a targeting reagent complement connected to the linking reagent; and (2) binding the product of step (1) to the binding domain comprising the targeting reagent complement, wherein (i) each binding domain comprises a different targeting reagent complement, and (ii) each targeting reagent complement selectively binds to one of the targeting reagents.

Accordingly, in embodiments, the surface comprises the targeting reagent complement; the targeting reagent is connected to the linking reagent; and each of the capture reagent and anchoring reagent comprises the supplemental linking reagent. Thus, in embodiments, the targeting reagent complement on the surface binds to the targeting reagent, which is connected to the linking reagent, which binds to the supplemental linking reagent on the capture reagent and the anchoring reagent.

In embodiments, the linking reagent has more than one binding site for supplemental linking reagents, and the immobilization of the capture reagent and anchoring reagent further comprises: binding the capture and anchoring reagent through the supplemental linking reagent to a targeting reagent connected to the linking reagent; and binding the product of to the binding domain comprising the targeting reagent complement, wherein, (i) each binding domain comprises a different targeting reagent complement, and (ii) each targeting reagent complement selectively binds to one of the targeting reagents. For example, in the case where the targeting agent is an oligonucleotide, the linking reagent is streptavidin and the supplemental linking agent is biotin, a biotin-labeled oligonucleotide can be bound to a first of the four biotin binding sites of a streptavidin to form the targeting reagent connected to a linking reagent. A biotin-labeled capture reagent (i.e., a capture reagent linked to the supplemental linking agent) can then bind to a remaining biotin binding site on the streptavidin to connect the targeting agent to the capture reagent.

Exemplary targeting reagents and targeting reagent complements are described herein. In embodiments, the targeting reagent and targeting reagent complement are two members of a binding partner pair selected from avidin-biotin, streptavidin-biotin, antibody-hapten, antibody-antigen, antibody-epitope tag, nucleic acid-complementary nucleic acid, aptamer-aptamer target, and receptor-ligand. In embodiments, the targeting reagent is biotin and the targeting reagent complement is streptavidin. In embodiments, the linking reagent and supplemental linking reagent pair is a different binding partner pair than the targeting reagent and targeting reagent complement pair. In embodiments, the linking reagent is avidin or streptavidin, and the supplemental linking reagent is biotin. In embodiments, the targeting reagent and targeting reagent complement are complementary oligonucleotides.

In embodiments, the methods of the invention are applied to singleplex or multiplex formats where multiple assay measurements are performed on a single sample. Multiplex measurements that can be used with the invention include, but are not limited to, multiplex measurements i) that involve the use of multiple sensors; ii) that use discrete assay domains on a surface (e.g., an array) that are distinguishable based on location on the surface; iii) that involve the use of reagents coated on particles that are distinguishable based on a particle property such as size, shape, color, etc.; iv) that produce assay signals that are distinguishable based on optical properties (e.g., absorbance or emission spectrum) or v) that are based on temporal properties of assay signal (e.g., time, frequency or phase of a signal). Exemplary assay formats include V-PLEX (www.mesoscale.com/en/products_and_services/assay_kits/v-plex) and U-PLEX (www.mesoscale.com/en/products_and_services/assay_kits/u-plex gateway, and U.S. Pat. Nos. 10,201,812 and 10,189,023, each of which is incorporated herein by reference in its entirety). Additional ultrasensitive assay formats include those disclosed in U.S. Provisional Appl. No. 62/812,928, filed Mar. 1, 2019, U.S. Provisional Appl. No. 62/866,512, filed Jun. 25, 2019, International Patent Publication No. WO 2020/0180645, and International Patent Publication No. WO 2020/227016, each of which is incorporated herein by reference in its entirety.

Exemplary plate readers include the MESO SECTOR S 600 and the MESO QUICKPLEX SQ 120, both available from Meso Scale Diagnostics, LLC., and the plate readers described in U.S. Pat. No. 6,977,722 and U.S. Provisional Patent Appl. No. 62/874,828, Titled: "Assay Apparatuses, Methods and Reagents" by Krivoy et al., filed Jul. 16, 2019 and International Patent Publication No. WO 2021/011630, each of which is incorporated by reference herein in its entirety.

Returning now to FIG. 1, in an embodiment, local assay computing systems 102 include computing systems collocated with assay devices 101 and configured to operate the assay devices 101. Local assay computing systems 102 may be specialty computing systems provided integrally or separately from the assay devices 101 and/or may be general purpose computing systems provided integrally or separately from the assay devices 101. Local assay computing system 102 may be configured with software for operating the assay devices 101 and for performing analyses of data captured by the assay devices 101. The local assay computing systems 102 may be configured as a server (e.g., having one or more server blades, processors, etc.), a personal computer (e.g., a desktop computer, a laptop computer, etc.), a smartphone, a tablet computing device, and/or other device that can be programmed to interface with an assay device 101. In an embodiment, any or all of the functionality of the local assay computing systems 102 may be performed as part of a cloud computing platform.

In an embodiment, the networked computing systems 104 include computing systems located remotely from the assay devices 101. The networked computing systems 104 may be connected to one or more assay devices 101, to one or more local assay computing systems 102, and/or to the one or more data storage devices 106 via the closed network 103 and/or the open network 105. In embodiments, the networked computing systems 104 may be disconnected from any network. The networked computing systems 104 may include software for operating the assay device 101 and/or for receiving and analyzing data captured by the assay devices 101. The networked computing systems 104 may be configured as a server (e.g., having one or more server blades, processors, etc.), a personal computer (e.g., a desktop computer, a laptop computer, etc.), a smartphone, a tablet computing device, and/or other device that can be programmed to interface with an assay device 101 and/or to receive and manipulate data generated by an assay device 101. In an embodiment, any or all of the functionality of the local assay computing systems 102 may be performed as part of a cloud computing platform.

In an embodiment, the one or more data storage devices 106 include devices and systems, such as servers, hard drives, etc., configured for data storage. The one or more data storage devices 106 are accessible by the local assay computing systems 102 and the networked computing systems 104. The data storage devices 106 may include any type of computer readable storage medium (or media) and/or a computer readable storage device. Such computer readable storage medium or device may be configured to store and provide access to data. Examples of computer readable storage medium or device may include, but is not limited to, an electronic storage device, a magnetic storage device, an optical storage device, an electromagnetic storage device, a semiconductor storage device, or any suitable combination thereof, for example, such as a computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a solid state drive (SSD), or a memory stick.

All devices within the assay system environment 100 may be connected in a network via wired or wireless links. In embodiments, one or more devices may be connected with each other through one or more closed networks 103 and/or open networks 105. Closed networks 103 include any type of non-public network, whether ad hoc or stable. Open networks 105 consistent with embodiments hereof include all types of public networks, such as the internet. Devices of the assay system environment 100 may be connected through any combination of multiple networks. In embodiments, some devices of the assay system environment 100 may not be connected to other devices of the system and may exchange data only through physical movement of storage media.

Networks consistent with embodiments described herein may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 2G, 3G, 4G, or 5G. Wireless standards may use various channel access methods, e.g., FDMA, TDMA, CDMA, or SDMA. In some embodiments, different types of data may be transmitted via different links and standards. In other embodiments, the same types of data may be transmitted via different links and standards. Network communications may be conducted via any suitable protocol, including, e.g., http, tcp/ip, udp, ethernet, ATM, etc.

The network may be any type and/or form of network. The geographical scope of the network may vary widely and the network can be a body area network (BAN), a personal area network (PAN), a local-area network (LAN), e.g., Intranet, a metropolitan area network (MAN), a wide area network (WAN), or the Internet. The topology of the network may be of any form and may include, e.g., any of the following: point-to-point, bus, star, ring, mesh, or tree. The network may be of any such network topology as known to those ordinarily skilled in the art capable of supporting the operations described herein. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv4), or the link layer. The network may be a type of broadcast network, a telecommunications network, a data communication network, or a computer network.

The network environment depicted in FIG. 1 represents an example embodiment of an assay system environment 100 configured to network and connect multiple assay devices. Although depicted as connected via networks 103 and 105, any suitable series of individual network connections may be employed to permit the various devices and systems associated with the assay system environment 100 to communicate appropriately.

In embodiments, any aspects of the assay system environment 100 providing data storage and/or computing capabilities may be provided by cloud computing solutions.

FIGS. 2-5 illustrate specific embodiments of assay devices 101 consistent with embodiments herein. The methods of the present embodiments may be used in conjunction with a variety of assay devices 101 and/or formats as discussed above. Although specific assay devices are pictured and described, the methods and systems described herein may be employed with any suitable assay device, system, or method.

Assay devices consistent with embodiments herein may be employed for, e.g., conducting and reading assays in a multi-well plate format that have one or more of the following desirable attributes: (i) high sensitivity, (ii) large dynamic range, (iii) small size and weight, (iv) array-based multiplexing capability, (v) automated operation; and (vi) ability to handle multiple plates. The apparatus and methods may be used with a variety of assay detection techniques including, but not limited to, techniques measuring one or more detectable signals. Some aspects are suitable for electrochemiluminescence measurements and, in particular, embodiments that are suitable for use with multi-well plates with integrated electrodes (and assay methods using these plates) such as those described in U.S. Pat. No. 7,842,246 of Wohlstadter et al., and U.S. Pat. No. 7,807,448 of Glezer et al., and U.S. Pat. No. 10,281,678 of Chamberlin et al., each of which is incorporated herein by reference in its entirety.

In an embodiment, the assay device 101 is provided for conducting luminescence assays in multi-well plates. For instance, an embodiment of the assay device 101 includes a light detection subsystem and a plate handling subsystem, wherein the plate handling subsystem includes a light-tight enclosure that provides a light-free environment in which luminescence measurements can be carried out. The light-tight enclosure includes a housing and a removable drawer that is placed within the housing. The housing also includes a housing top having one or more plate introduction apertures through which plates can be lowered onto or removed from a plate translation stage (manually or mechanically) within the drawer. A sliding light-tight door in the housing is used to seal the plate introduction apertures from environmental light prior to carrying out luminescence measurements. The housing further includes a detection aperture that is coupled to a light detector mounted on the housing top and one or more plate stackers mounted on the housing top above the plate introduction apertures, wherein the plate stackers are configured to receive or deliver plates to plate elevators within the removable drawer. The removable drawer includes a plate translation stage for translating a plate horizontally in the drawer to zones within the apparatus where specific assay processing and/or detection steps are carried out. The removable drawer also includes one or more plate elevators with a plate lifting platform that can be raised and lowered within the drawer, wherein the plate elevators are positioned below the one or more plate introduction apertures. The plate translation stage is configured to position plates below the detection aperture and to position plates above the plate elevators on the plate lifting platforms.

The assay device 101 may also include a light detector which is mounted to the detection aperture on the housing top (e.g., via a light-tight connector or baffle). In certain embodiments, the light detector is an imaging light detector such as a CCD camera and may also include a lens. The light detector may be a conventional light detector such as a photodiode, avalanche photodiode, photomultiplier tube, or the like. Suitable light detectors also include arrays of such light detectors. Light detectors that may be used also include imaging systems such as CCD and CMOS cameras. The light detectors may also include lens, light guides, etc. for directing, focusing, and/or imaging light on the detectors. In certain specific embodiments, an imaging system is used to image luminescence from arrays of binding domains in one or more wells of an assay plate, and the assay apparatus reports luminescence values for luminescence emitted from individual elements of the arrays. The light detector is mounted on the housing top with a light-tight seal. Additional components of the apparatus include plate contacts for making electrical contact to the plates and providing electrical energy to electrodes in wells positioned under the light detector (e.g., for inducing ECL).

Figures 2A, 2B:
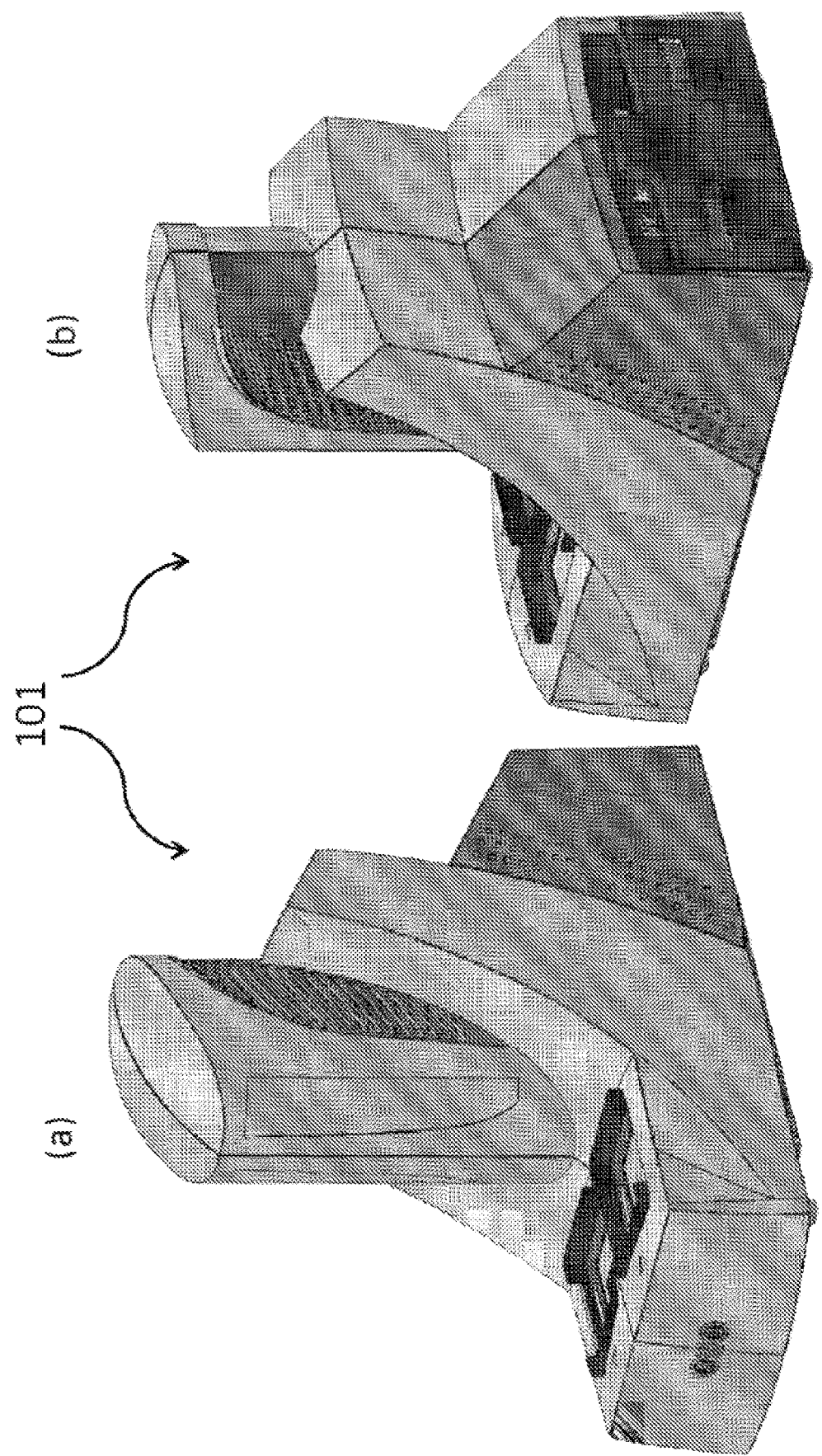
FIGS. 2A-2D illustrate an assay device consistent with embodiments hereof.
Figure 2D:
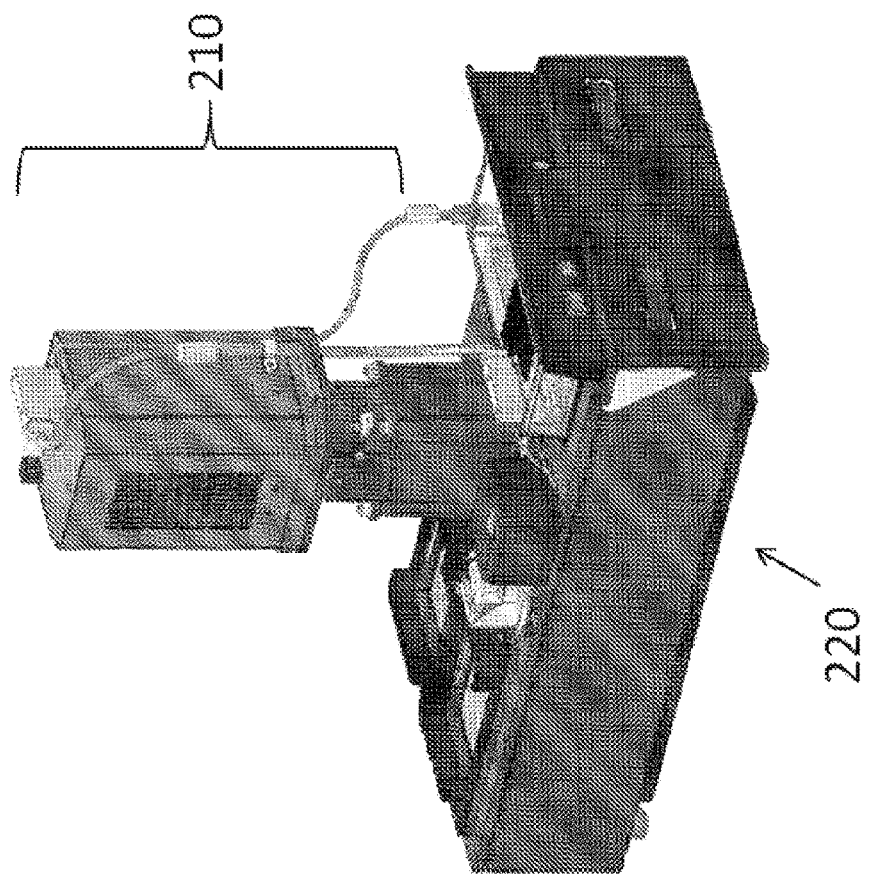
Figure 2C:
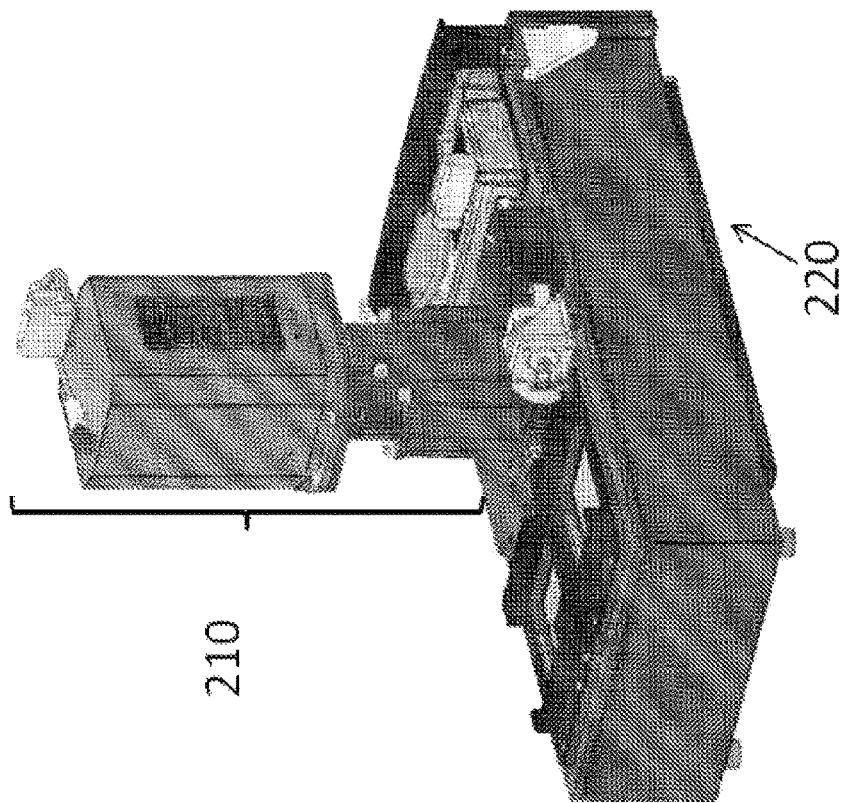

Further elements of the assay device 101 are illustrated in FIGS. 2A and 2B which show a front and rear view, respectively, of the assay device 101 with an aesthetic cover, and in FIGS. 2C and 2D, which show the corresponding front and rear views, respectively, of the assay device without the cover. As shown, e.g., in FIG. 2D, the apparatus includes a light detection subsystem 210 and a plate handling subsystem 220. A more detailed view is provided in FIGS. 3A-3B. The plate handling subsystem 220 includes a light tight enclosure 230 comprising a housing 331 having a housing top 332, bottom 333, front 334, and rear 335. The housing also includes a plurality of alignment features, and the housing is adapted to receive a removable drawer 340 (pictured in FIG. 4) including a removable drawer front and consisting of a unitary casting element.

Figure 3C:
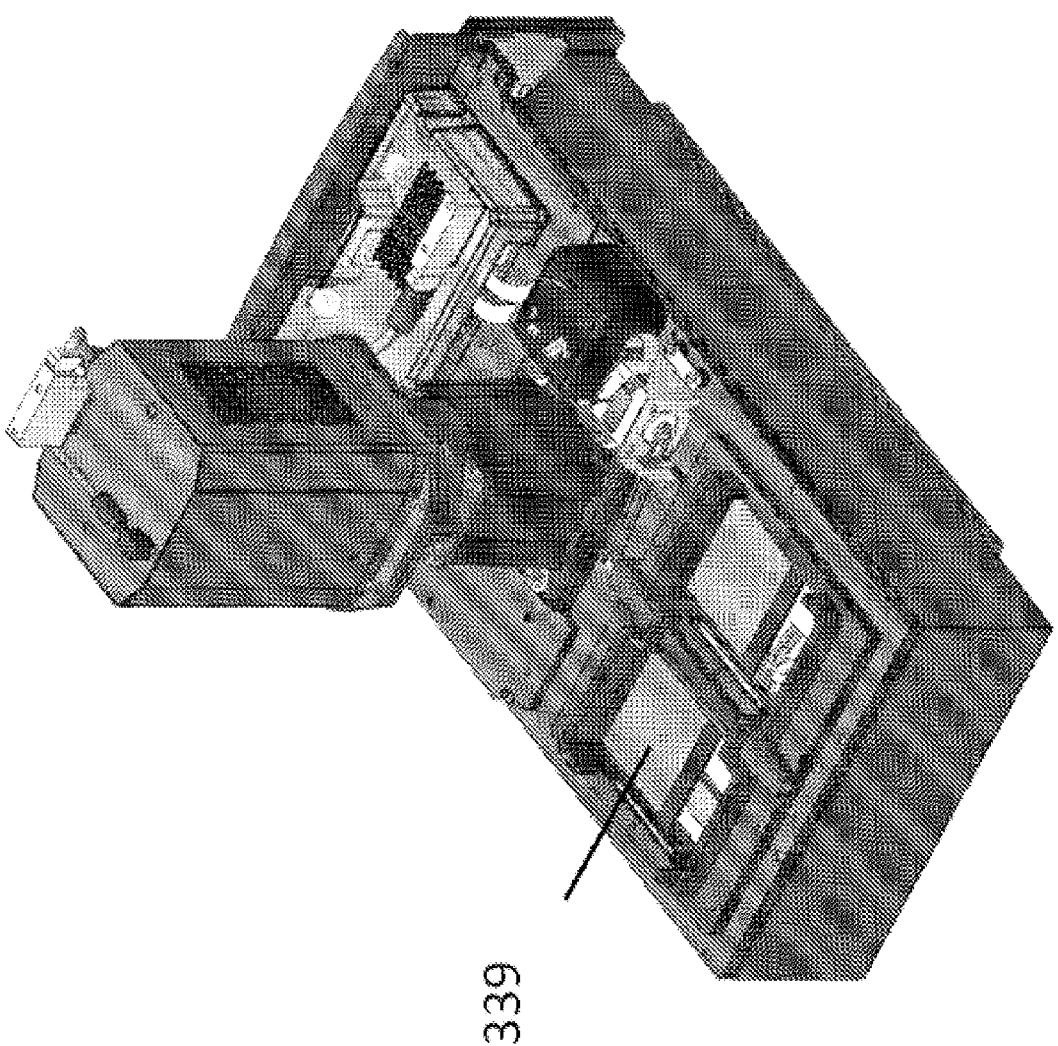
Figure 4:
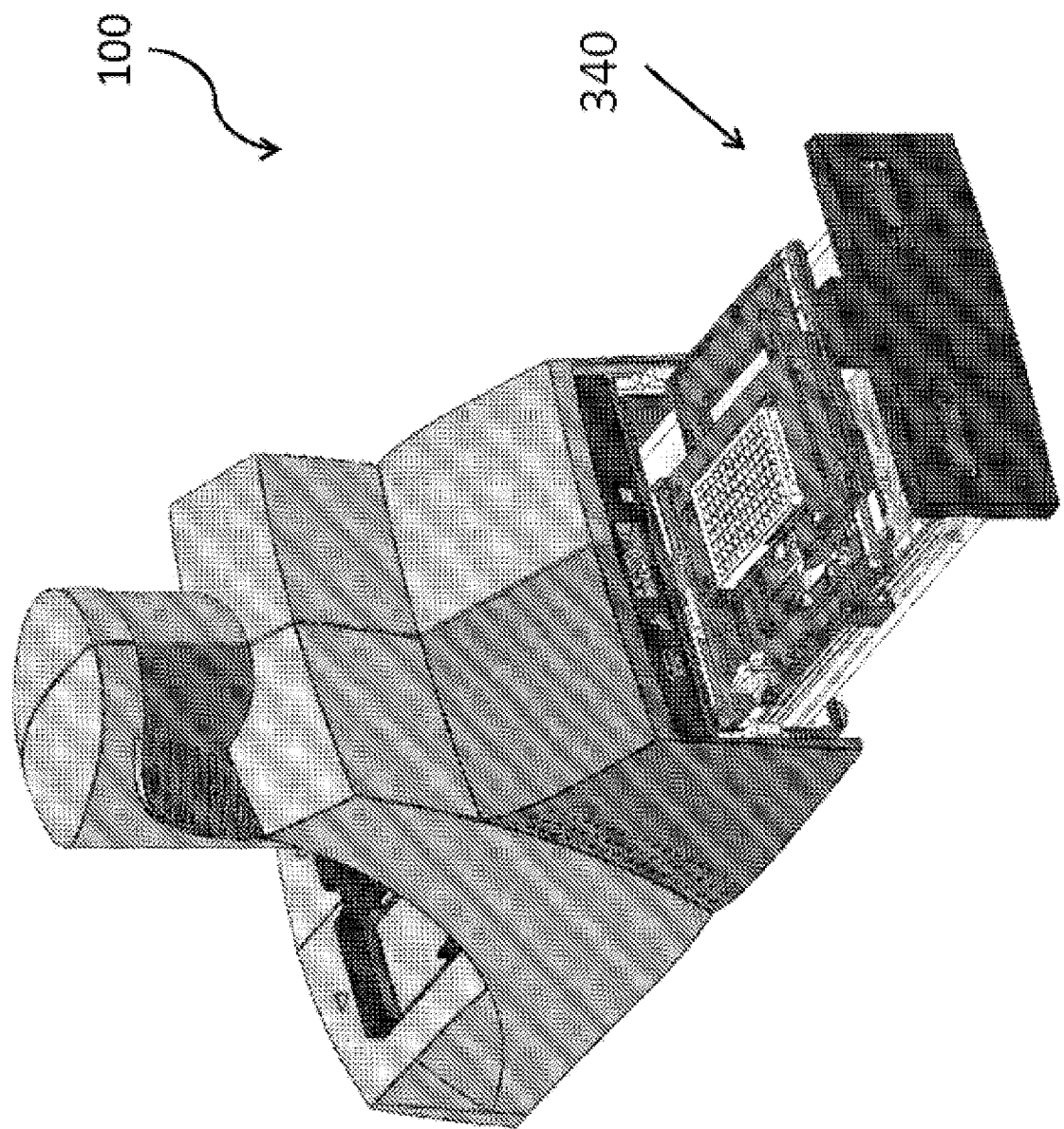
FIG. 4 illustrates an assay device consistent with embodiments hereof.

Referring to FIG. 3A, the housing top 332 also includes one or more plate introduction (and ejection) apertures, 336 and 337, respectively, through which plates are lowered onto or removed from the plate translation stage (manually or mechanically). A sliding light-tight door (shown in FIG. 3C as 339) is used to seal the plate introduction apertures 336, 337 from environmental light prior to carrying out luminescence measurements. Moreover, the housing top also includes an identifier controller to read and process data stored to an identifier on the plates.

In embodiments, the assay device 101 includes features, such as an identifier controller, for the automated identification of sample plates. In an embodiment, an identifier controller is a bar code reader (338) mounted via a light-tight seal over an aperture in the housing top, where the bar code reader is configured to read bar codes on plates placed on the plate translation stage within the housing. In a preferred embodiment, the bar code on a plate is read when the plate has been lowered into the drawer. In an alternative or additional embodiment, the plates comprise an identifier such as an EEPROM or an RFID, and the housing top and/or drawer includes an identifier controller suitable for communicating with each of these identifiers. In further embodiments, an identifier controller can be provided separately from the apparatus. In this embodiment, information stored to an identifier attached to a plate or associated with a plate or a set of plates is transferred to the apparatus via a computer and/or network attached thereto and/or manually input via a user interface of the computer and/or network. In this regard, reference is made to U.S. Patent Publication Nos. 2011/0022331 and U.S. Pat. No. 8,770,471, the disclosures of which are incorporated herein by reference.

In some cases, the plate handling subsystem 220 further includes one or more plate stackers mounted on the housing top 332 above the plate introduction apertures 336, 337, wherein the plate stackers are configured to receive or deliver plates to the plate elevators. The plate handling subsystem optionally includes a heating and/or cooling mechanism (e.g., a resistance heater, a fan, heat sinks, or a thermoelectric heater/cooler) to maintain temperature of the subsystem under desired conditions. It may also include a humidity control mechanism (e.g., a humidifier and/or dehumidifier, or a desiccant chamber to maintain the humidity of the subsystem under desired conditions.

Figure 5:
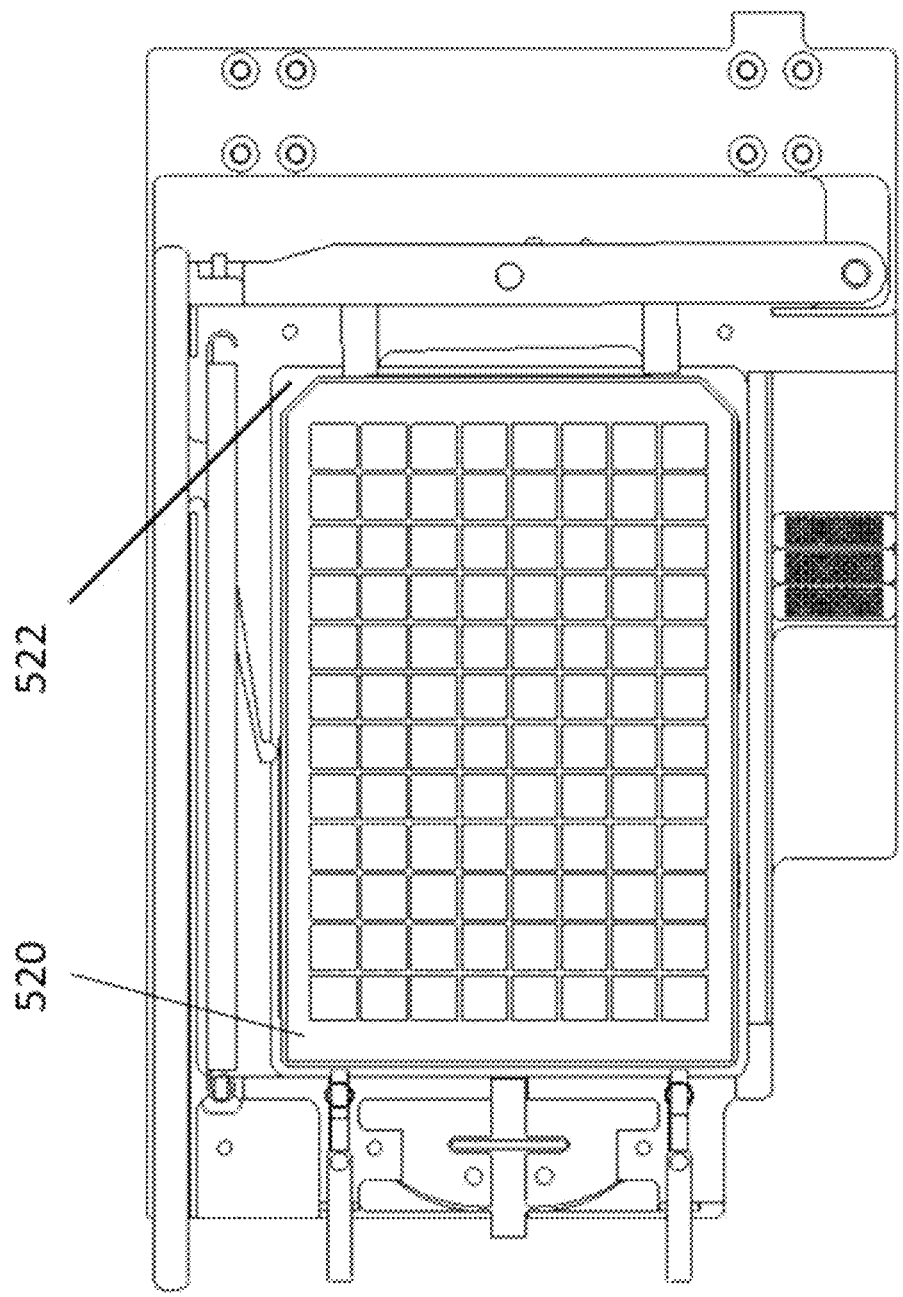
FIG. 5 illustrates features of an assay device consistent with embodiments hereof.

FIG. 5 illustrates a plate carriage 522 with a multi-well plate 520. The plate carriage 522 supports the multi-well plate 520 (or other consumable configured for use in the assay device 101). The plate carriage 522 is configured to support the multi-well plate 520 within the assay device 101. Multi-well plates 520 (also known as microtiter plates or microplates) consistent with embodiments herein may take a variety of forms, sizes, and shapes. For convenience, some standards have appeared for instrumentation used to process samples for high-throughput assays. Multi-well assay plates typically are made in standard sizes and shapes and have standard arrangements of wells. Arrangements of wells include those found in 96-well plates (12×8 array of wells), 384-well plates (24×16 array of wells), and 1536-well plates (48×32 array of wells). The methods and systems discussed herein, however, are not limited to specific plate or assay formats.

Assay devices 101, as described herein, are configured to perform both calibration assays and sample assays. As described here, calibration assays include assays performed on calibration samples that have defined quantities of an analyte. The calibration samples may include calibration samples having different respective quantities of an analyte. A plurality of calibration assay signal values are obtained by the assay devices 101 in response to the different, known, quantities or concentrations of analyte during the calibration assays. Subsequent to performing a calibration assay, the assay device 101, and/or a local assay computing system 102 associated with the assay device 101, may store the calibration data (i.e., information representing the known analyte quantities and corresponding calibration assay signal values) in any suitable storage device associated with the assay system environment 100. In embodiments, multiple calibration assay signal values may be obtained to correspond to a single known analyte quantity. That is, a calibration sample may be measured multiple times.

Quantity, as used herein, may refer to the total amount of an analyte in sample expressed, for example, in units of amount such as weight or volume, moles, or number of molecules. Quantity may also refer to the concentration of the analyte. Quantity may also refer to the amount of chemical, biological or catalytic activity associated with an analyte. Quantity may be provided in absolute terms, or it may be in relative units, relative to a reference sample or material.

Assay devices 101, as described herein, are further configured to perform sample assays on one or more test samples each having an unknown quantity of an analyte. Performing a sample assay on a test sample generates a sample assay signal value. The sample assay signal value is indicative of the unknown quantity of the analyte associated therewith. In embodiments, multiple sample assay signal values may be obtained to correspond to a single test sample unknown analyte quantity. That is, a test sample may be measured multiple times.

Figure 6:
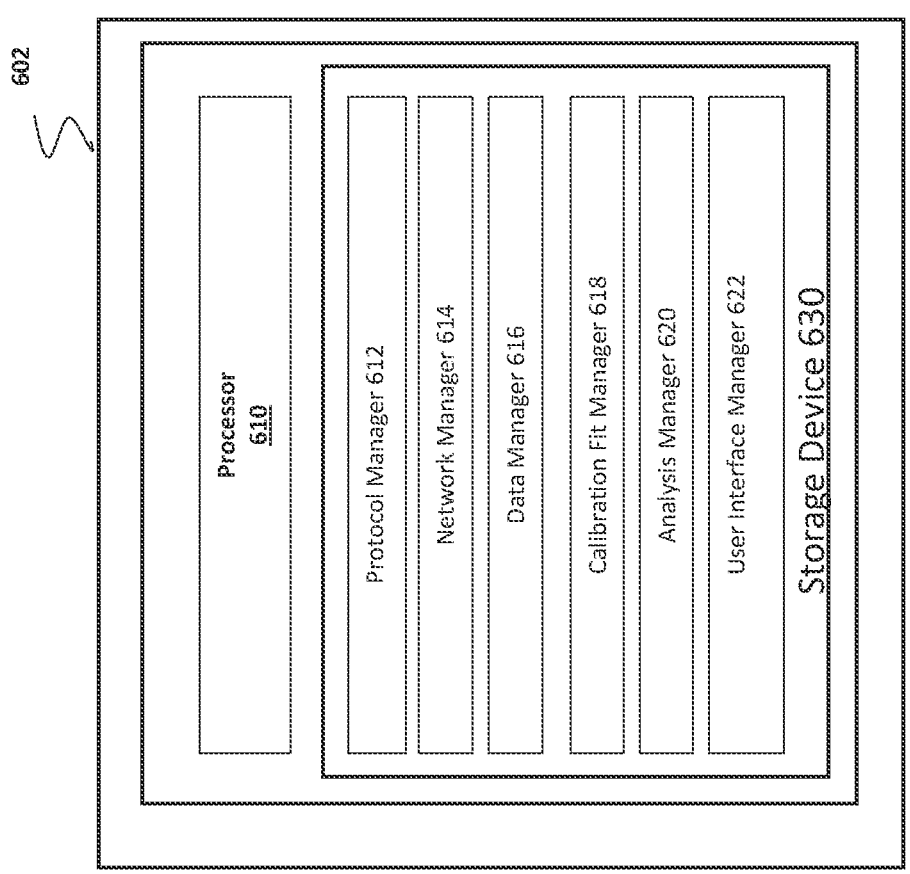
FIG. 6 illustrates a computing system consistent with embodiments hereof.

FIG. 6 illustrates an embodiment of a computer system consistent with embodiments hereof. The computing system 602 is an example of local assay computing systems 102 and networked computing system 104. For instance, the computing system 602 may include a server, a personal computer, a smartphone, and/or a tablet computing device. Additionally, the function of the computing systems 602 may be carried out via a cloud computing platform.

The computing system 602 may include one or more processors 610 (also interchangeably referred to herein as processing units 610, processors 610, processor(s) 610, or processor 610 for convenience), one or more storage device(s) 630, and/or other components. In other embodiments, the functionality of the processor may be performed by hardware (e.g., through the use of an application specific integrated circuit ("ASIC"), a programmable gate array ("PGA"), a field programmable gate array ("FPGA"), etc.), or any combination of hardware and software. The storage device 630 includes any type of non-transitory computer readable storage medium (or media) and/or non-transitory computer readable storage device. Such computer readable storage media or devices may store computer readable program instructions for causing a processor to carry out one or more methodologies described here. Examples of the computer readable storage medium or device may include, but is not limited to an electronic storage device, a magnetic storage device, an optical storage device, an electromagnetic storage device, a semiconductor storage device, or any suitable combination thereof, for example, such as a computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, but not limited to only those examples.

The processor 610 is programmed by one or more computer program instructions stored on the storage device 630 and executable by the processor 610. For example, the processor 610 is programmed by a protocol manager 612, a network manager 614, a data manager 616, a calibration fit manager 618, an analysis manager 620, and a user interface manager 622. It will be understood that the functionality of the various managers as discussed herein is representative and not limiting. Additionally, the storage device 630 may act as a data storage device 106 to provide data storage for the assay system environment 100. As used herein, for convenience, the various "managers" will be described as performing operations, when, in fact, the managers program the processor 610 (and therefore the computing system 602) to perform the operation.

The protocol manager 612 is a software protocol (e.g., software module or library) that may operate on the computing system 602. The protocol manager 612 is configured to provide one or more control signals to one or more assay devices 101. The control signals provided by the protocol manager 612 are configured to provide instructions necessary to operate the one or more assay devices 101. The control signals may specify one or more assay protocols to be carried out by the one or more assay devices. Control signals provided by the protocol manager 612 may be used to initiate and/or control any process that an assay device 101 described herein is capable of.

In embodiments, the protocol manager 612 may further operate to receive data collected during operation of the one or more assay devices 101. Such data may include, for example, calibration assay data and sample assay data. Received data may then be processed or stored via the data manager 616.

The protocol manager 612 is configured to operate to control one or more assay devices 101 to perform calibration assays. Assay devices 101 may be controlled by the protocol manager 612 to obtain calibration assay measurements on a plurality of calibration samples (e.g., calibration samples stored as calibrators in a multi-well plate) having defined quantities of an analyte. The plurality of calibration samples may include different quantities of the analyte. The protocol manager 612 operates to determine calibration assay signal values corresponding to the plurality of calibration samples. The protocol manager 612 is configured to perform the calibration assays to determine one or more calibration data sets. The calibration data sets include information relating the plurality of quantity values to a corresponding plurality of calibration assay signal values.

The protocol manager 612 is further configured to operate to control one or more assay devices 101 to perform sample assays. Assay devices 101 may be controlled by the protocol manager 612 to obtain sample assay measurements on a plurality of test samples (e.g., test samples disposed in a multi-well plate) having unknown quantities of an analyte. The protocol manager 612 operates to determine sample assay signal values corresponding to the plurality of test samples. The protocol manager 612 is configured to perform the sample assays to determine one or more sample assay data sets. The sample assay data sets may include information relating the sample assay signal values to sample identification data. Sample identification data may include any suitable data for identifying a test sample, such as plate location.

The network manager 614 is a software protocol (e.g., software module or library) that may operate on the computing system 602. The network manager 614 is configured to establish network communications between the networks 103, 105 of FIG. 1, assay devices 101, data storage devices 106, and/or any other devices in the assay system environment 100. The established communications pathway may utilize any appropriate network transfer protocol and provide for one way or two way data transfer. The network manager 614 may establish as many network communications as required to communicate with various elements of the assay system environment 100.

The network manager 614 facilitates the sending and receiving of sample assay data, calibration assay data (also referred to as calibration assay information), sample assay and calibration assay protocols, calibration models, and any other information and/or consistent with the operation of the assay system environment 100.

The data manager 616 is a software protocol or software module that may operate on the computing system 602. The data manager 616 is configured to access assay data, such as sample assay data and calibration assay data of one or more assay devices 101 of the assay system environment 100. Assay data may include, for example, sample assay data sets and calibration data sets, which may be obtained in near real time, may be archived data, and/or may be data extracts, as well as process information and process parameter information and any other information or data generated by or stored on an assay device 101. The data manager 616 is further configured to access one or more data storage devices 106, local assay computer systems 102, and/or networked computer system 104, and to store and/or receive assay data stored in any or all of these. In further embodiments, the data manager 616 is configured to access various removable physical storage media that may store assay data.

The data manager 616 may provide data to a user via the user interface manager 622. In embodiments, the data manager 616 is further configured to provide access tools to the user to manage and manipulate assay data (also referred to as assay system data). For example, the data manager 616 may be configured to generate reports, collate assay system data, cross-reference assay system data, populate databases with assay system data, etc. In embodiments, the data manager 616 may provide data retention capabilities. The data manager 616 is further configured to receive and store any and all data collected and/or used within the assay system environment 100.

The calibration fit manager 618 is a software protocol (e.g., software module or library) operating on the computing system 602. The calibration fit manager 618 is configured to access any or all data storage systems of the assay system environment 100 described herein to obtain data sets necessary for performing calibration fit operations. In particular the calibration fit manager 618 is configured to obtain calibration data sets and generate calibration models. Calibration models include at least a calibration model equation and associated fitting parameters.

As discussed above, calibration data sets include the results of calibration assay measurements conducted on a plurality of calibration samples containing analytes of known quantity. The calibration samples have defined quantities of analytes and may include calibration samples having different quantities of the analyte. As discussed herein, the defined quantities may be defined absolutely or relative to a reference standard or samples. The calibration data sets include a plurality of quantity values and a plurality of assay signal values corresponding to the plurality of quantity values. Where multiple calibration assay signal values are obtained to correspond to a single known quantity value, these may be treated as individual data points or aggregated together (e.g., as an average, weighted average, geometric average, median, etc.) to be treated as a single data point. The calibration assay signal values may be, e.g., values of a quantity measured by an assay device 101.

The calibration fit manager 618 is configured to fit the dependence of the assay signal values on the plurality of quantity values for a calibration model equation. Calibration model equations are employed to model analyte detection response. Calibration model equations are selected for specific uses according to various characteristics. For example, a specific calibration model equation may be selected for ease of use, overall accuracy or goodness of fit, accuracy or goodness of fit over a specific region, and other characteristics. Calibration model equations are used to generate estimates of results and do not represent laws of nature or natural phenomena.

In embodiments, calibration model equations used to generate calibration fits include modified four parameter logistic regression fit equations. A generic four parameter logistic fit (4PL) equation may be represented as follows:

$$y = A + \frac{B - A}{1 + (C/x)^D}.$$

In the 4PL equation, x represents an assay quantity value, y represents an assay signal value, and A, B, C, and D represent fitting parameters.

Figure 7:
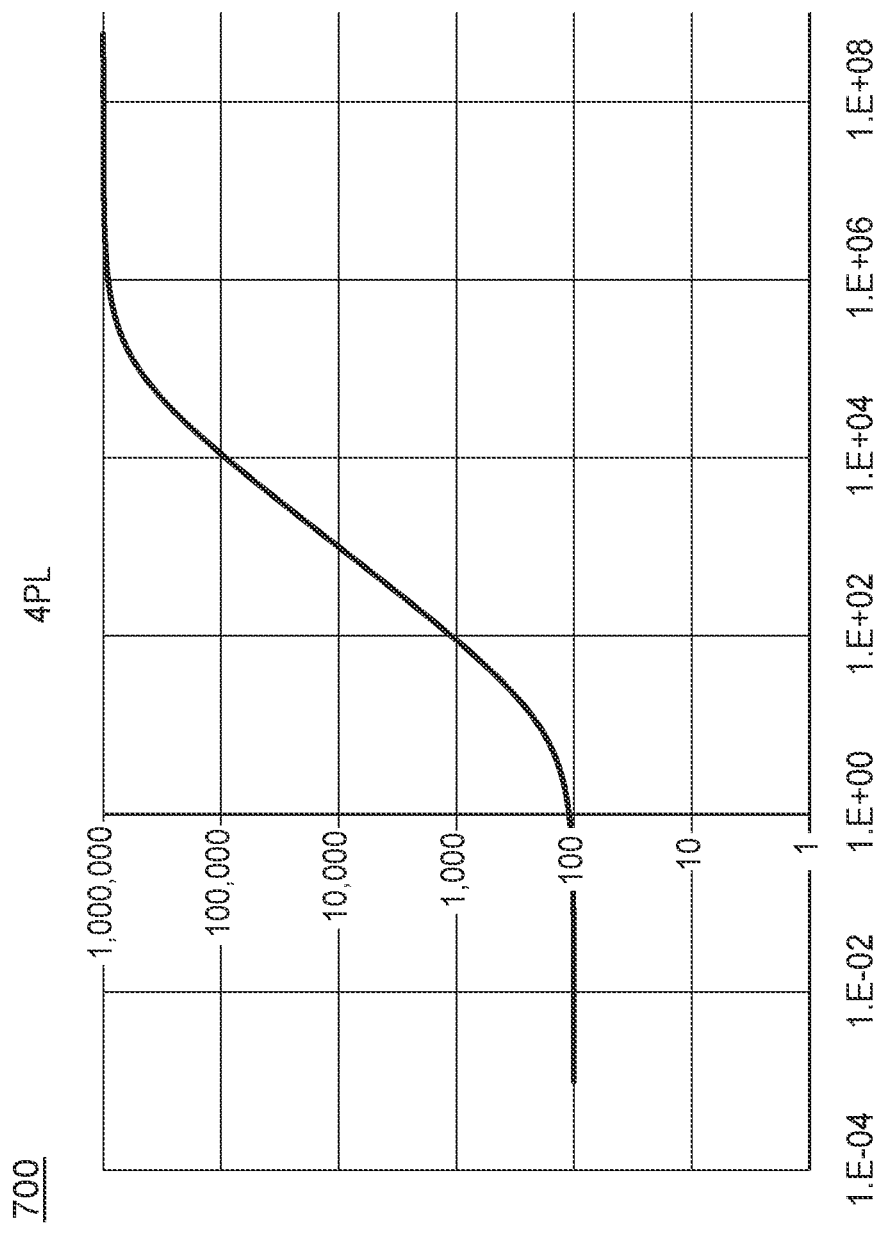
FIG. 7 illustrates a four parameter logistic regression fit calibration curve consistent with embodiments hereof.

The 4PL equation generates an S shaped, or sigmoid, curve 700, as shown in FIG. 7. The fitting parameters define the features of the curve. The parameter A represents an asymptote of the curve. B represents the other asymptote of the curve. C represents the quantity (e.g., analyte quantity) that produces a signal midway between A and B and represents the inflection point of the S shaped curve. Finally, D represents the Hill's slope of the curve and is related to the order of the function describing the curve at the quantity C or, in a log-log plot as shown in FIG. 7, the steepness of the curve at the quantity C. In the example represented by FIG. 7, A=100, B=1,000,000, C=100,000, and D=1.

In examples such as that presented in FIG. 7, where D>0, A represents the asymptote value of y at low values of x, i.e., the value the assay signal value y approaches as the assay quantity value x decreases to values <<C; and B represents the asymptote value of y at high values of x, i.e., the value the assay signal value y approaches as the assay quantity value x goes to increases to values >>C. Alternatively, when D<0, A represents the asymptote value of y at high values of x and B represents the asymptote value of y at low values of x.

In embodiments, a first equation used as a calibration model equation is a modified four parameter logistic regression fit (referred to herein as "4PL+") equation where a constant value Hill's slope of the 4 PL fit is modified by making it variable according to a function of the quantity of the analyte. In the first 4PL+ equation, Eq. 1A, the function of the quantity is a logarithmic function of the quantity. The first 4PL+ equation, Eq. 1A is $$y = A + \frac{B-A}{1+(C/x)^{D+E\ln C/x}}$$

wherein, x represents a quantity value, y represents an assay signal value, and A, B, C, D, and E are fitting parameters. As discussed in more detail below, Eq. 1A does not produce a true sigmoid curve, but has a local maximum or minimum y value. However, during calibration fitting, as discussed below, parameter values for Eq. 1A may be selected such that the function is sigmoidal or approximately sigmoidal over a range of quantities x that are used for calibration.quantities. Over this range, the parameter A represents a bound or limit of the curve, and the parameter B represents the other bound or limit of the curve, i.e., the values of y that are approached as x approaches the lower or higher ends of the range (the range in which the 4PL+ equation is monotonically changing). C represents the quantity x which gives a signal y midway between A and B. Finally, the expression D+E ln C/x, a logarithmic function of the quantity, represents the modified Hill's slope of the curve. At x=C, the modified Hill's slope is simply D. Thus, D is the effective Hill's slope at the midpoint quantity C. E represents the increment provided to the modified Hill's slope per log of quantity change. As the assay quantity value varies away from C, the modified Hill's slope varies. The modified Hill's slope varies monotonically with changes in x.

The 4PL+ equation (Eq. 1A) may be inverted to generate equation Eq. 1B, expressed as a function of y:

$$x = C * e^{\left[\frac{D - \sqrt{D^2 + 4E\ln\left(\frac{B-A}{y-A} - 1\right)}}{2E}\right]}.$$

Expressing the 4PL+ equation as a function of y facilitates back-fitting the calibration results from the assay signal value y to the assay quantity value x to determine the accuracy of the calibration fit as well as determining unknown assay quantity values x from assay signal values y. The inverted equation Eq. 1B is one of two roots of Eq. 1A. In embodiments, the second root, equation Eq. 1C (shown below) may be selected for use in determining unknown assay quantity values from assay signal values. In embodiments, both Eq. 1B and Eq. 1C may be used and the best result may be selected. In embodiments, a determination to use either Eq. 1B or Eq. 1C may be made by the calibration fit manager 618. In embodiments, this determination is achieved by back-fitting, using Eq. 1B and Eq. 1C, the signal from a calibration sample or other sample with a known quantity and selecting the equation that generates a calculated quantity closest to this known value. The selected equation is the one that is then applied to other samples including samples of unknown quantity. Eq. 1C, can be expressed as a function of $$y: x = C * e^{\left[\frac{D + \sqrt{D^2 + 4E\ln\left(\frac{B-A}{y-A} - 1\right)}}{2E}\right]}.$$

For non-zero values of D and E, Eq. 1A is not typically sigmoidal over all possible positive values of x, and there is a value of x that generates a maxima or minima of y. For positive values of E, and at very small and very large positive values of x, the equation asymptotes to B, but has a maximum or minimum where y approaches A, For negative values of E, and at very small and very large positive values of x, the equation asymptotes to A, but has a maximum or minimum where y approaches B, In both these cases, there is a range of x values that produces a graph of y that is sigmoidal or approximately sigmoidal in shape with y values at the ends of the graph approaching A and B. Thus, when determining the parameters A, B, C, D, and E for a calibration fit, the parameters may be selected such that the assay signal y of Eq. 1A is approximately sigmoidal and monotonically changing over a quantity range x that is of interest, e.g., a quantity range x within which results are expected. In embodiments, the parameters of Eq. 1A may be selected such that the assay signal y is approximately sigmoidal and monotonically changing over a specified assay dynamic range for x, for example, at least a range between a lower limit of quantitation and an upper limit of quantitation. In embodiments, the parameters are set such that over a specified dynamic range for x, the ratio of the absolute value of E*ln(C/x) to the absolute value of D is less than 1, less than 0.5, or less than 0.2. In embodiments, the parameters are set such that over a specified dynamic range for x, the ratio of −E*ln(C/x) to D is less than 1, less than 0.5, or less than 0.2.

In embodiments, a second equation used as a calibration model equation is a modified four parameter logistic regression fit (referred to herein as "4PL+") equation where the constant value Hill's slope of the 4-PL fit is modified by making it variable according to a function of the quantity x. In the second 4PL+ equation, the function quantity is proportional to the inverse of the quantity x. The second 4PL+ equation, Eq. 2A is $$y = A + \frac{B-A}{1+(C/x)^{D+E\left(\frac{C}{x}\right)}}$$

wherein x represents a quantity value of analyte, y represents an assay signal value, and A, B, C, D, and E are fitting parameters. Depending on the selected values of D and E, the function may provide a sigmoid curve or may provide a curve where Y has a local maximum or minimum. During calibration fitting, parameters values for Eq. 2A may be selected such that the function is sigmoidal over the full range of positive values of x, or (as described for Eq. 1A) is sigmoidal or approximately sigmoidal over a range of quantities x that are used for calibration. Over this range, the parameter A represents a bound or limit of the curve, and the parameter B represents the other bound or limit of the curve, i.e., the values of y that are approached as x approaches the lower or higher ends of the range. C represents the quantity at which the signal is midway between A and B. Finally, the expression D+E(C/x), a function of the quantity, represents the modified Hill's slope of the curve. At x=C, the modified Hill's slope is simply D+E. Thus, D+E is the effective Hill's slope at the midpoint quantity C. E represents the increment provided to the modified Hill's slope according to changes in the quantity. As the assay quantity value varies away from the quantity inflection point, the modified Hill's slope varies according to the inverse of the quantity. The modified Hill's slope varies monotonically with changes in x.

It is understood that all equations discussed herein may be represented in an unlimited number of alternate, but mathematically equivalent, forms without changing the essential nature of the equation. Defining the fitting parameters for one form will inherently define the fitting parameters for the other forms, for example, through mathematical expressions relating the two sets of parameters. For example, the generic 4PL equation $$y = A + \frac{B-A}{1+(c/x)^D}$$

is also commonly written as:

$$y = C + \frac{D-C}{1+(x/c)^D}$$

where C=B and D=A. In another example, Eq. 1A may be written as $$y = A + \frac{B-A}{1+(C/x)^{F-E \ln x}},$$

where F=(D+E*ln(C)). Many more examples exist. Although a limited number of representations of Eq. 1A, Eq. 2A, etc., are provided herein, it is understood that the methods and techniques disclosed herein may be employed with any equivalent of the described equations.

FIGS. 8-14 illustrate features of Eq. 1A over a range of quantities as the different fitting parameters vary.

Figure 8:
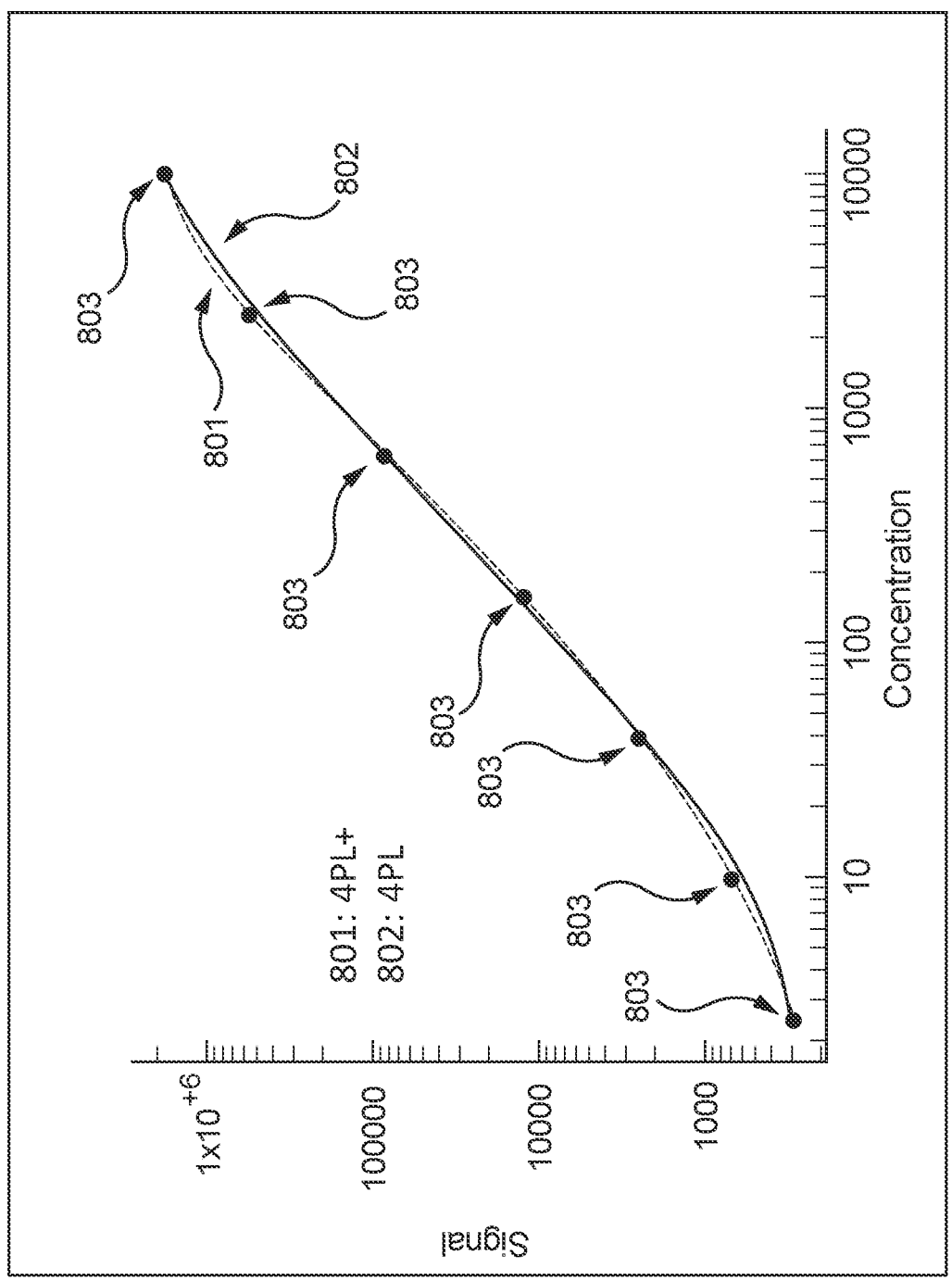
FIG. 8 illustrates a modified four parameter logistic regression fit calibration curve consistent with embodiments hereof.

FIG. 8 illustrate a comparison of the generic 4PL equation and the 4PL+ equation Eq. 1A in calibrating a human MDC assay run on an ECL imaging instrument. ECL signal values shown in the graph were averaged over 5 plates, with 4 replicates per plate run in different wells. As shown in FIG. 8 the 4PL+ fit line 801 demonstrates a better fit with the assay signal values 803 as compared to the 4PL fit line 802. In particular, the 4PL fit line 802 shows greater inaccuracies at low quantity and high quantity values. Table 1 below shows example values of the parameters of the 4PL+ and 4PL equations to produce the fit line 801 and the fit line 802.

TABLE 1

| Parameter | | 4PL Value | 4PL+ Value |
|---|---|---|---|
| A | Lower Asymptote | 253 | 16 |
| B | Upper Asymptote | 3,735,665 | 2,246,768 |
| C | Quantity/Concentration Midpoint | 10,546 | 4,885 |
| D | Hill's Slope | 1.34 | 1.73 |
| E | Hill's Slope Increment | n/a | −0.06 |

Figure 9:
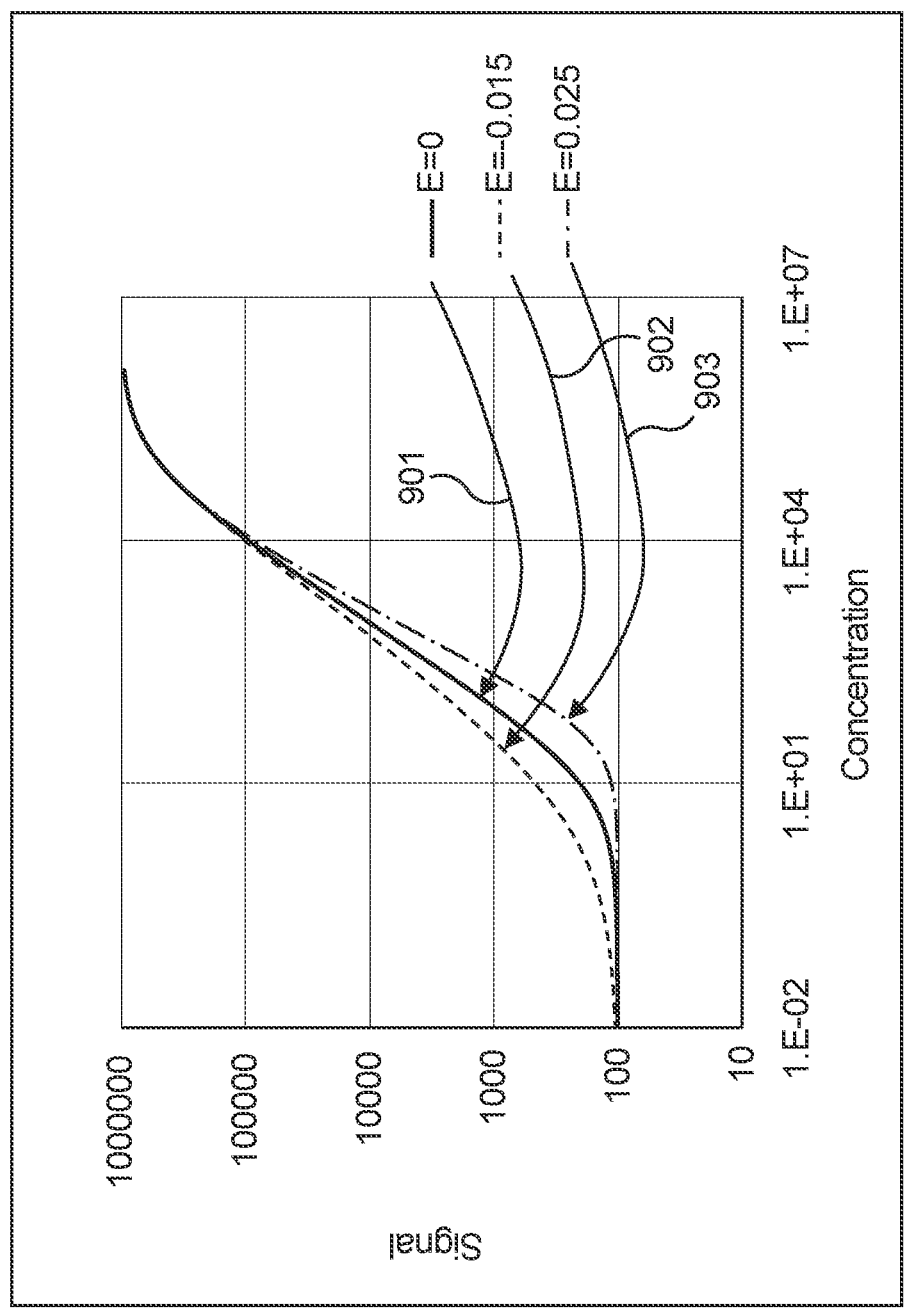
FIG. 9 illustrates aspects of a four parameter logistic regression fit calibration curve consistent with embodiments hereof.

FIG. 9 illustrates the effect of changes in the value of E on the 4PL+ equation Eq. 1A. FIG. 9 illustrates the 4PL+ equation over a range of quantities for positive, negative, and zero values of E. Where E is zero (fit line 901), as discussed above, the 4PL+ equation reduces to the generic 4PL equation. A positive value for E (e.g., fit line 903) results in a lower signal value for the 4PL+ equation at lower quantities. A negative value for E (e.g., fit line 902) results in a higher signal value for the 4PL+ equation at lower quantities. Table 2 below shows example values of the parameters of the 4PL+ equations to produce the fit lines 901, 902, 903.

TABLE 2

| Parameter | | E = 0/901 | E = −0.015/02 | E = 0.025/903 |
|---|---|---|---|---|
| A | Lower Asymptote | 100 | 100 | 100 |
| B | Upper Asymptote | 1,000,000 | 1,000,000 | 1,000,000 |
| C | Quantity/Concentration Midpoint | 100,000 | 100,000 | 100,000 |
| D | Hill's Slope | 1.00 | 1.00 | 1.00 |
| E | Hill's Slope Increment | 0 | −0.015 | 0.025 |

Figure 10:
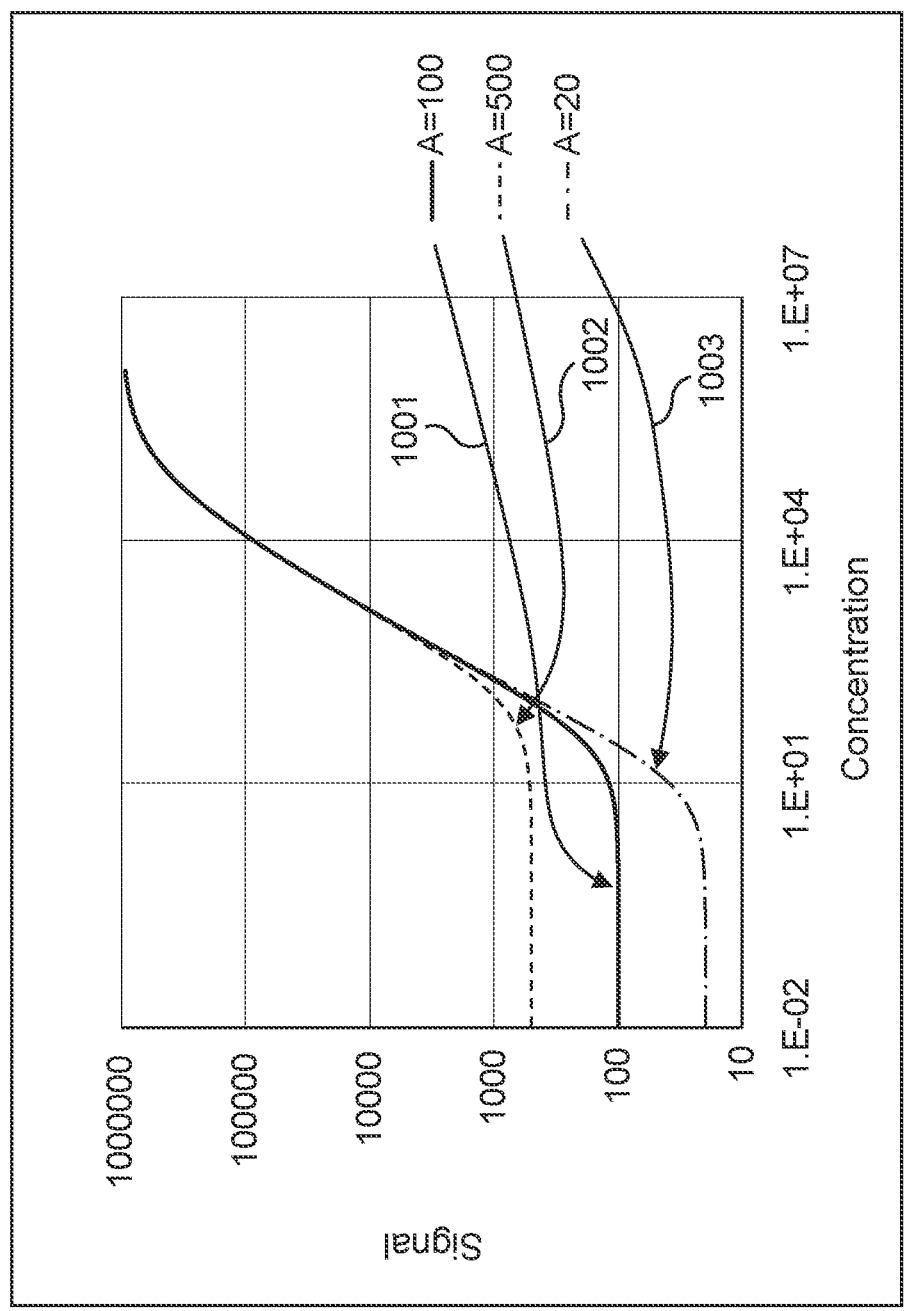
FIG. 10 illustrates aspects of a four parameter logistic regression fit calibration curve consistent with embodiments hereof.

FIG. 10 illustrates the effect of changes in the value of A on the 4PL+ equation Eq. 1A. Adjustments to A in the 4PL+ equation change the value of the lower bound, just as in the 4PL equation. Fit line 1001 illustrates the 4PL+ equation with a value of A=100, fit line 1002 is produced with a value of A=500, and fit line 1003 is produced with a value of A=20. Table 3 below shows example values of the parameters of the 4PL+ equations to produce the fit lines 1001, 1002, 1003.

TABLE 3

| Parameter | | Fit Line 1001 | Fit Line 1002 | Fit Line 1003 |
|---|---|---|---|---|
| A | Lower Asymptote | 100 | 500 | 20 |
| B | Upper Asymptote | 1,000,000 | 1,000,000 | 1,000,000 |
| C | Quantity/Concentration Midpoint | 100,000 | 100,000 | 100,000 |
| D | Hill's Slope | 1.00 | 1.00 | 1.00 |
| E | Hill's Slope Increment | 0.02 | 0.02 | 0.02 |

Figure 11:
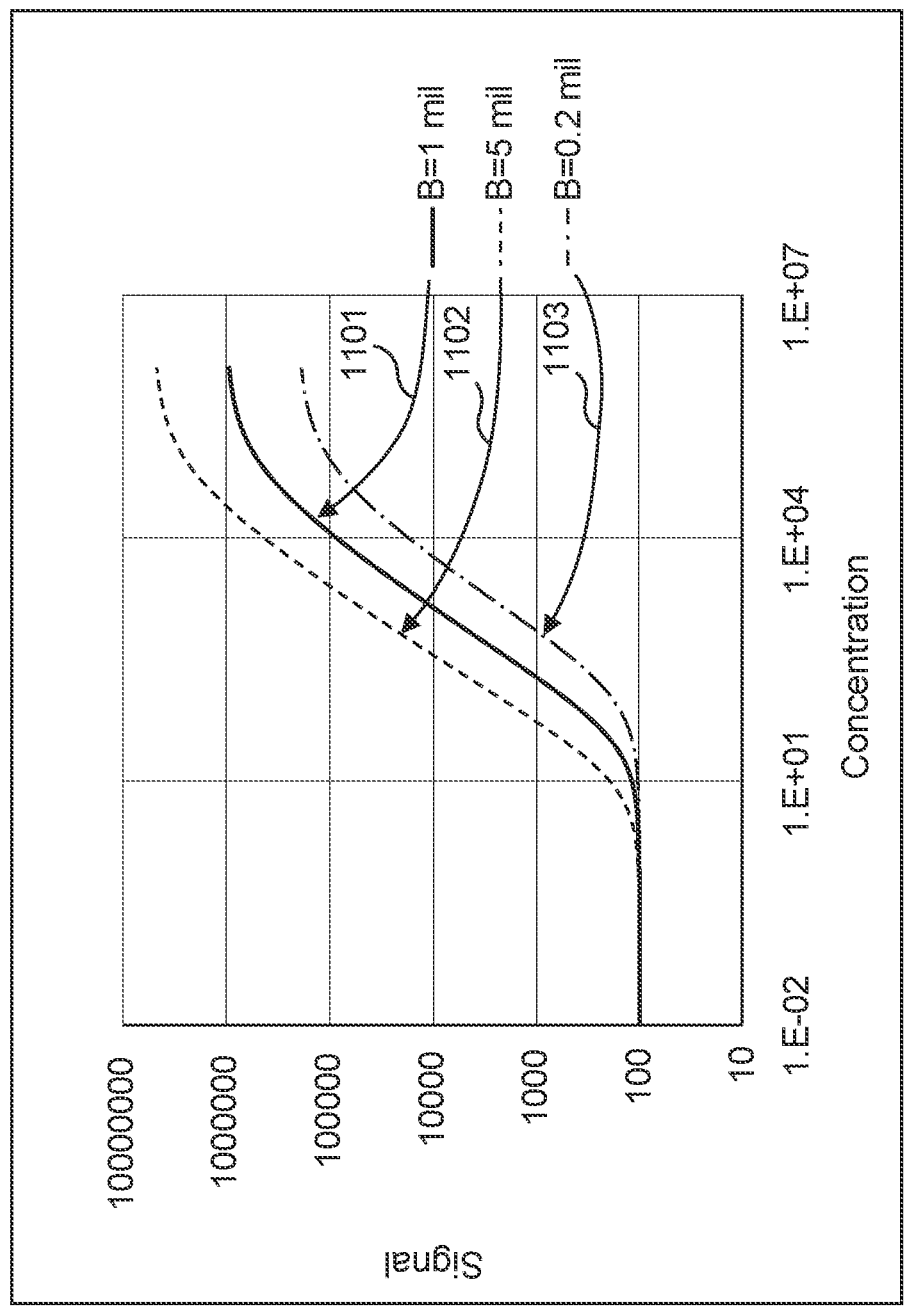
FIG. 11 illustrates aspects of a four parameter logistic regression fit calibration curve consistent with embodiments hereof.

FIG. 11 illustrates the effect of changes in the value of B on the 4PL+ equation Eq. 1A. Adjustments to B in the 4PL+ equation change the value of the upper bound, just as in the 4PL equation. Fit line 1101 illustrates the 4PL+ equation with a value of B=1,000,000, fit line 1102 is produced with a value of B=5,000,000, and fit line 1103 is produced with a value of B=200.00. Table 4, below shows example values of the parameters of the 4PL+ equations to produce the fit lines 1101, 1102, 1103.

TABLE 4

| Parameter | | Fit Line 1101 | Fit Line 1102 | Fit Line 1103 |
|---|---|---|---|---|
| A | Lower Asymptote | 100 | 100 | 100 |
| B | Upper Asymptote | 1,000,000 | 5,000,000 | 200,000 |
| C | Quantity/Concentration Midpoint | 100,000 | 100,000 | 100,000 |
| D | Hill's Slope | 1.00 | 1.00 | 1.00 |
| E | Hill's Slope Increment | 0.02 | 0.02 | 0.02 |

Figure 12:
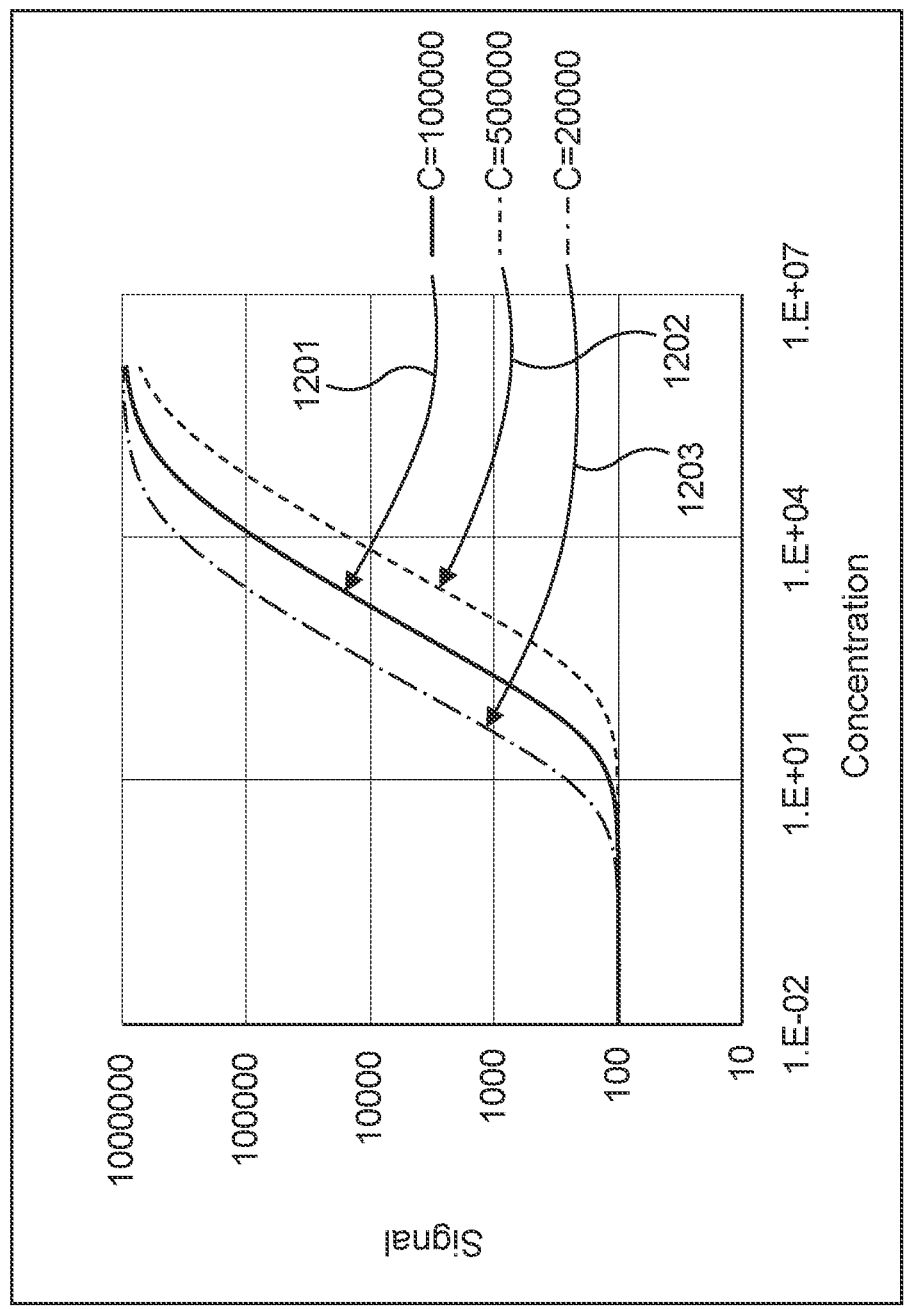
FIG. 12 illustrates aspects of a four parameter logistic regression fit calibration curve consistent with embodiments hereof.

FIG. 12 illustrates the effect of changes in the value of C on the 4PL+ equation Eq. 1A. Adjustments to C in the 4PL+ equation change the value of the quantity midpoint, just as in the 4PL equation. Fit line 1201 illustrates the 4PL+ equation with a value of C=100,000, fit line 1202 is produced with a value of C=500,000, and fit line 1203 is produced with a value of C=20,000. Table 5, below shows example values of the parameters of the 4PL+ equations to produce the fit lines 1201, 1202, 1203.

TABLE 5

| Parameter | | Fit Line 1201 | Fit Line 1202 | Fit Line 1203 |
|---|---|---|---|---|
| A | Lower Asymptote | 100 | 100 | 100 |
| B | Upper Asymptote | 1,000,000 | 1,000,000 | 1,000,000 |
| C | Quantity/Concentration Midpoint | 100,000 | 500,000 | 20,000 |
| D | Hill's Slope | 1.00 | 1.00 | 1.00 |
| E | Hill's Slope Increment | 0.02 | 0.02 | 0.02 |

Figure 13:
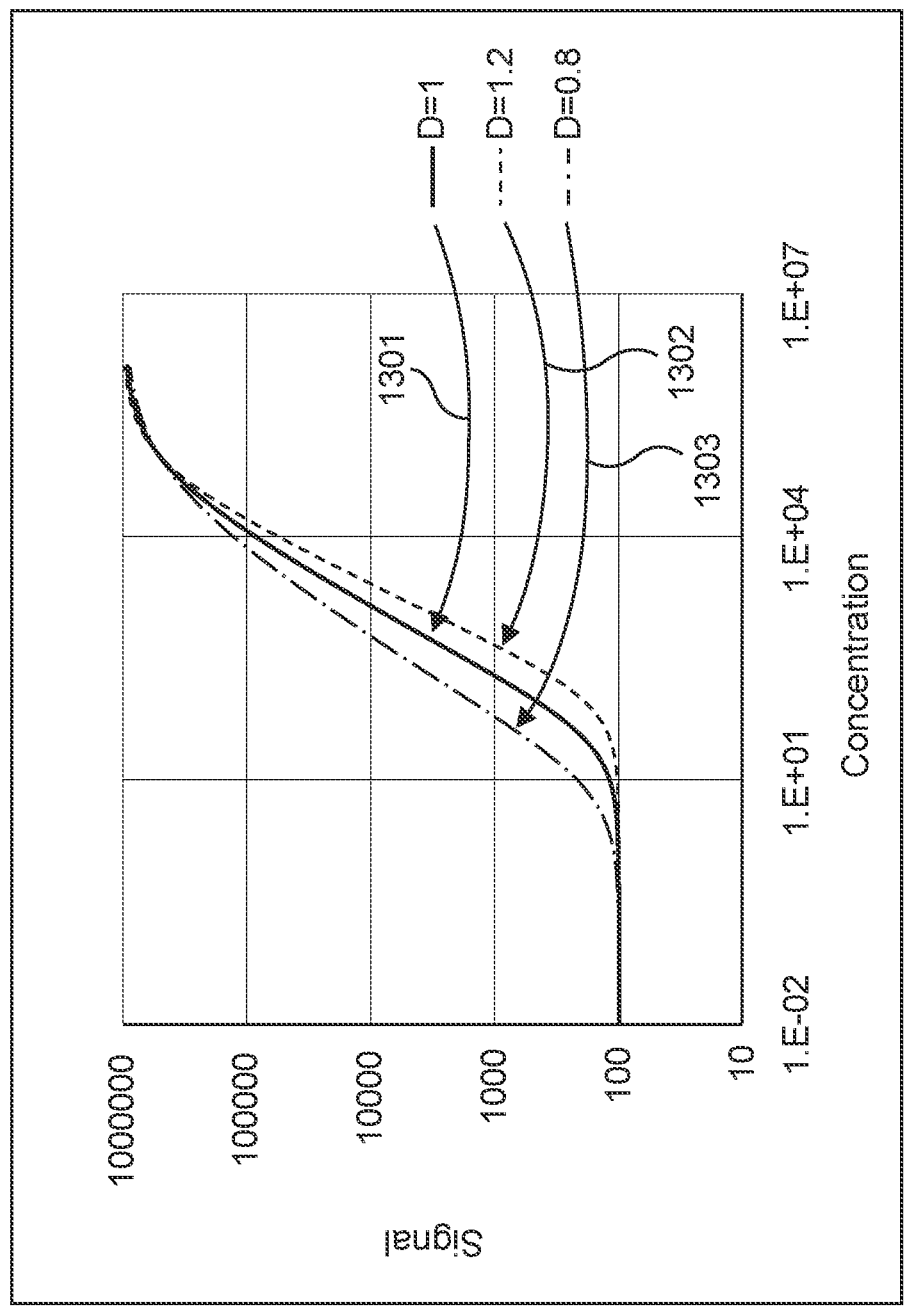
FIG. 13 illustrates aspects of a four parameter logistic regression fit calibration curve consistent with embodiments hereof.

FIG. 13 illustrates the effect of changes in the value of D on the 4PL+ equation Eq. 1A. Adjustments to D in the 4PL+ equation change the value of the equation slope, just as in the 4PL equation. Fit line 1301 illustrates the 4PL+ equation with a value of D=1, fit line 1302 is produced with a value of D=1.2, and fit line 1303 is produced with a value of D=0.8. Table 6, below shows example values of the parameters of the 4PL+ equations to produce the fit lines 1301, 1302, 1303.

TABLE 6

| Parameter | | Fit Line 1301 | Fit Line 1302 | Fit Line 1303 |
|---|---|---|---|---|
| A | Lower Asymptote | 100 | 100 | 100 |
| B | Upper Asymptote | 1,000,000 | 1,000,000 | 1,000,000 |
| C | Quantity/Concentration Midpoint | 100,000 | 100,000 | 100,000 |
| D | Hill's Slope | 1.00 | 1.20 | 0.8 |
| E | Hill's Slope Increment | 0.02 | 0.02 | 0.02 |

In further embodiments, unbounded or topless modified 4PL equations may be selected as the calibration model equation. These unbounded or topless modified 4PL equations do not have an upper asymptote and may be selected for use with assays that do not have plateaus for signal values at high analyte quantity values. A topless modified 4PL equation consistent with embodiments hereof includes Eq. 3A, which is a topless modified four parameter logistic regression fit equation where a modified Hill's slope is variable according to a logarithmic function of the quantity. Eq. 3A may be represented as:

$$y = A + B(x/C)^{D + E \ln\left(\frac{x}{C}\right)}.$$ (65)

An additional topless modified 4PL equation consistent with embodiments hereof includes Eq. 4A, which is a topless modified four parameter logistic regression fit equation where the modified Hill's slope is variable according to an inverse function of the quantity. Eq. 4A may be represented as $$y = A + B(x/C)^{D+E\left(\frac{x}{C}\right)}.$$

In equations Eq. 3A and Eq. 4A, y, x, A, B, D, and E represent the same values as discussed above with respect to equations Eq. 1A and Eq. 2A. C is a selected constant that represents the midpoint quantity, or the quantity at the inflection point of the S shaped curve. In embodiments, C is set equal to the geometric midpoint of the highest analyte quantity and the lowest non-zero analyte quantity used in the test. C may also be set to unity. In some embodiments, C may also be a fitting parameter.

FIGS. 8-13 demonstrate the ways in which the 4PL+ equation Eq. 1A of the present disclosure differ from generic 4PL equations and the ways in which parameter modifications alter calibration curves. These differences may provide advantages in calibration accuracy. In embodiments, due to the ability to vary the value of the modified Hill's slope with quantity, the 4PL+ equations provide a closer calibration fit for certain assays.

Figure 14:
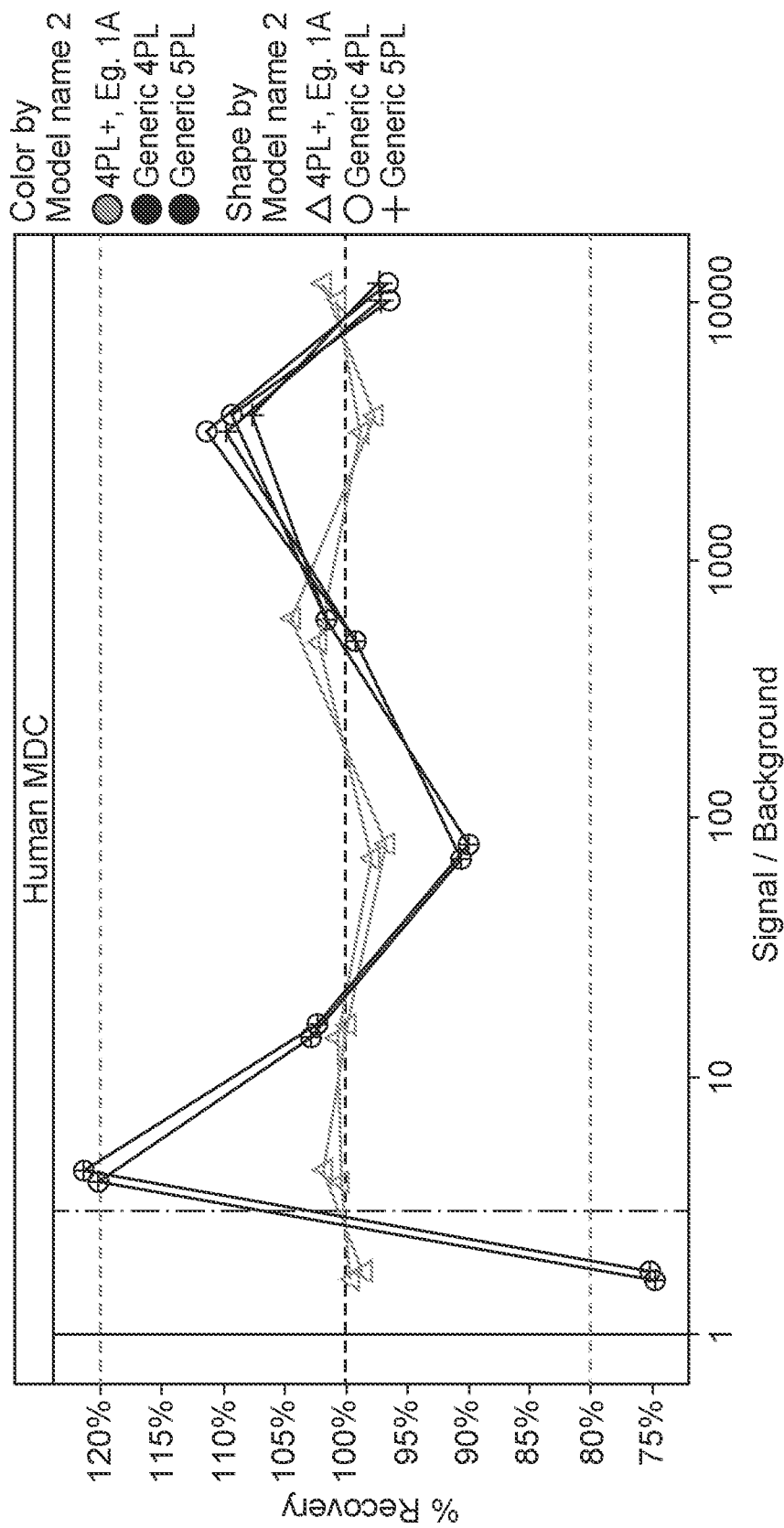
FIG. 14 illustrates recovery percentages of different calibration fit equations applied to a representative assay according to embodiments hereof.

FIG. 14 shows the recovery percentage for several calibration curve points against signal to background ratio for different calibration model equations for an assay for human MDC, run on an ECL imaging instrument similar to those described herein. For each calibration curve point, the ECL signal values were averaged across results on 5 plates, with 4 replicates per plate in different wells. The calibration model equations represented in FIG. 14 are the 4PL+ equation Eq 1A, the generic 4PL equation, and a generic 5PL equation $$y = A + \frac{B - A}{(1 + (C/x)^D)^E}.$$

As shown in FIG. 14, the 4PL+ equation Eq. 1A provides a better fit, closer to 100% recovery, across the range of signal values.

Figure 15:
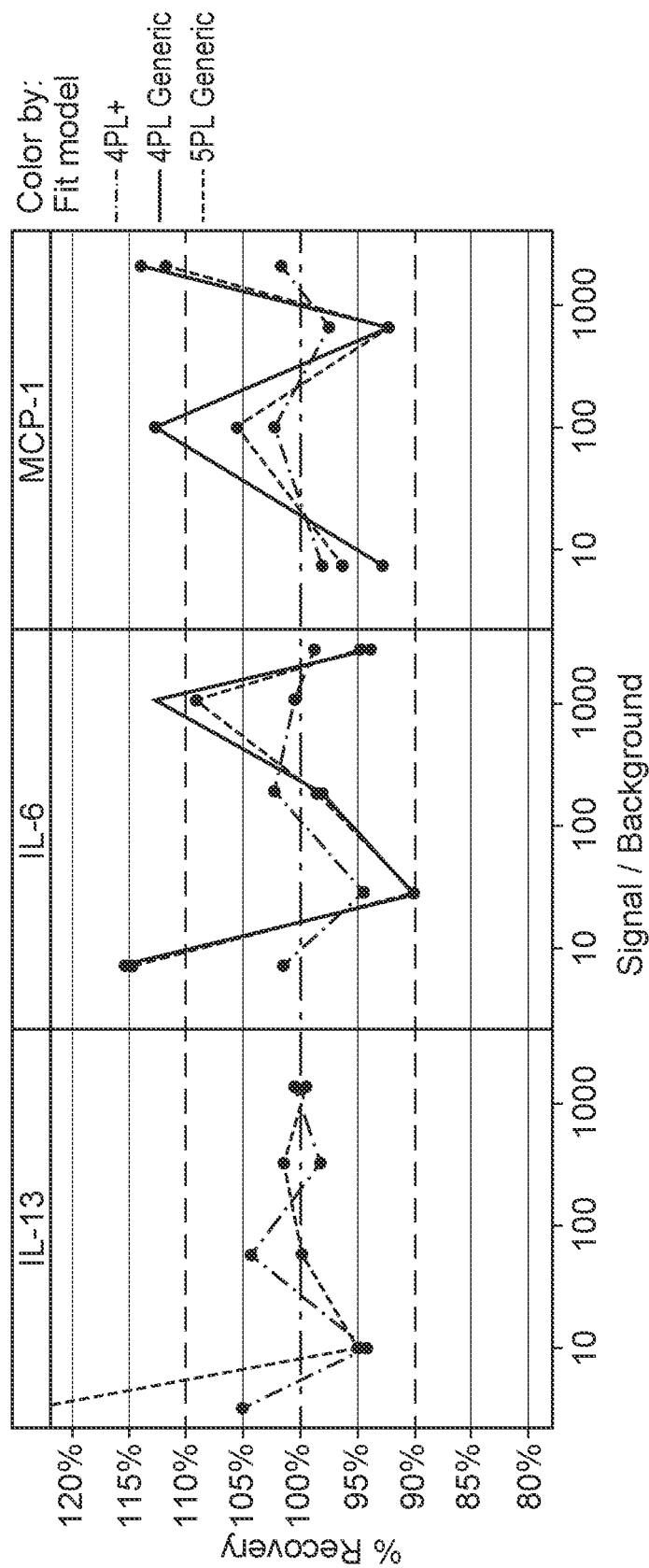
FIG. 15 shows the recovery percentages for several calibration curve points against signal to background ratio for different calibration model equations according to embodiments hereof.

FIG. 15 shows the recovery percentage for several calibration curve points against signal to background ratio for different calibration model equations for three assays run on a Magpix® instrument (Luminex Corporation). For each calibration curve point, median fluorescence intensity (MFI) signal values were averaged across two replicates. The calibration model equations represented in FIG. 15 are the 4PL+ equation Eq 1A, the generic 4PL equation, and a generic 5PL equation $$y = A + \frac{B - A}{(1 + (C/x)^D)^E}.$$

As shown in FIG. 15, the 4PL+ equation Eq. 1A provides a better fit, closer to 100% recovery, across the range of signal values.

Returning now to FIG. 6, the calibration fit manager 618 operates to determine values for fitting parameters of the 4PL+ equations Eq. 1A, Eq. 2A, Eq. 3A, and/or Eq. 4A based on the calibration data set. The calibration data set includes calibration assay signal values that correspond to known assay quantity values. Any suitable curve fitting method may be employed, including, for example, a Levenberg-Marquardt algorithm, a Gauss-Newton algorithm, and a Gradient descent algorithm, to determine the fitting parameters of the selected model equation In embodiments, identifying values for the fitting parameters includes determining respective values of the fitting parameters that minimize a mean squared error or sum of squares error between the calibration data set and the values for the fitting parameters as obtained from the calibration model. In embodiments, a curve fitting method is employed after weighting the x or y values. In embodiments, a curve fitting method may be employed that minimizes the mean squared error or the sum of squares error after applying a $1/y^2$ weighting, also referred to as relative weighting. Weighting by $1/y^2$ adjusts the curve fit to account for the larger signal values and respectively larger variance values at higher quantities.

The fitting parameters are determined according to calibration assay data obtained via one or more calibration assays performed by the one or more assay devices 101 of FIG. 1. In operation, the calibration fit manager 618 of FIG. 6 may obtain the calibration assay data as it is generated by the one or more assay devices 101 (e.g., obtain the calibration assay data directly from the one or more assay devices 101). In further embodiments, the calibration fit manager 618 may access stored calibration data on which to perform calibration fit operations (e.g., stored calibration data on data storage device 106).

The model equation and fitting parameters are collectively referred to herein as a calibration model. These may be stored as calibration information at any suitable data storage location within the assay system environment 100. The calibration information may include one or more calibration models (selected model equations and one or more sets of fitting parameters or fitting parameter values associated with each of the selected model equations), and/or calibration assay data. The calibration information may be stored in such a fashion as to be associated with the assay media (e.g., multiwell plate) that the calibration information pertains to. The calibration information may further be associated with the assay device 101 that was used to perform the calibration assay which yielded the calibration information. Accordingly, any system or device within the assay system environment 100 that accesses the calibrated assay media may obtain or retrieve the stored calibration information.

The analysis manager 620 is a software protocol (e.g., software module or library) operating on the computing system 602 and is configured to access any or all data storage systems of the assay system environment 100 described herein to obtain sample assay data sets necessary for performing assay analysis operations. In particular, the analysis manager 620 is configured to obtain sample assay data sets and determine sample quantity values.

The analysis manager 620 is configured to obtain one or more sample assay data sets. Sample assay data sets may be obtained from any storage location (e.g., data storage device 106) within the assay system environment 100 and/or may be obtained directly from an assay device 101 as it is obtained. The sample assay data sets include the results of assay measurements on at least one test sample. The assay measurements include at least one sample assay signal value corresponding to the at least one test sample. In embodiments, the sample assay data sets may include any number of assay measurements on any number of test samples, including multiple sample assay signal values per test sample.

The analysis manager 620 is further configured to determine (e.g., select) calibration information associated with the sample assay data set. The calibration information associated with the sample assay data set (e.g., a calibration information associated with the multi-well plate from which the sample assay data set was obtained) may be retrieved from any suitable storage location of the assay system environment 100.

Based on the obtained sample assay test data (e.g., one or more assay signal values) and a calibration model (which may include a selected model equation and respective values of associated fitting parameters), the analysis manager is configured to determine one or more sample quantity or quantity values. The appropriate values of fitting parameters and assay signal values are input into the selected model equation, which may then be solved for the sample quantity value. In embodiments, the equation is solved numerically to determine the sample quantity value, for example, by employing one of the many algorithms known in the art for solving equations. A short, non-limiting, list of some of the many algorithms that may be used includes the bisection method, the secant method, Newton's method, Steffensen's method and Brent's method). In embodiments, the selected model equation is inverted to facilitate the sample quantity value. The analysis manager 620 is configured to perform sample quantity value calculations for any and all sample assay signal values stored in the sample assay data set.

The user interface manager 622 is a software protocol (e.g., software module or library) operating on the computing system 602. The user interface manager 622 is configured to provide a user interface to allow user interaction with the computing system 602. The user interface manager 622 is configured to receive input from any user input source, including but not limited to touchscreens, keyboards, mice, controllers, joysticks, voice control. The user interface manager 622 is configured to provide a user interface, such as a text based user interface, a graphical user interface, or any other suitable user interface. In embodiments, the user interface manager 622 may be configured to provide a "methodical user interface" (MUI), as described in U.S. patent application Ser. No. 16/513,526, issued on Mar. 2, 2021 as U.S. Pat. No. 10,936,163, which is incorporated by reference herein in its entirety. The user interface manager 622 is configured to use the network manager 614 to provide such user interface services through one or more clients or computing systems 602. The user interface manager 622 may be configured to provide different user interface services depending on a type of client device. For example, a laptop or desktop computer may be provided with a user interface including a full suite of interface options, while a smartphone or tablet may be provided with a user interface limited to status updates.

The user interface manager 622 is configured to provide user authentication services. Users may be authenticated via, for example, passwords, biometric scanning (retina scans, fingerprints, voice prints, facial recognition, etc.), key cards, token access, and any other suitable means of user authentication. User authentication services may be provided to control access to one or more assay devices 101.

In embodiments, one or more users may be provided full access to all functionality, process information, and/or production information of the assay system environment 100. One or more users may be provided with limited access to functionality, process information, and/or production information of the assay system environment 100. One or more users may be provided with full access to a limited portion of the assay system environment 100. In some embodiments, one or more users may be provided with "read only" access that permits viewing of process information, production information, etc., but does not permit any adjustments to process parameters. Further, one or more users may be provided with full or limited access to archived data. Access controls may be determined according to user identity, user function, user job identity, and any other suitable criteria.

In embodiments, the user interface manager 622 may provide one or more users with access to any or all process and/or production information about one or more elements of the assay system environment 100. The user interface manager 622 may permit a user to perform various tasks on one or more devices of the assay system environment. For example, the user interface manager 622 may permit a user to adjust or control one or more protocol parameters directly.

The various managers, as discussed herein, may be implemented by any combination of computing devices of the assay system environment 100. In embodiments, this distributed nature permits the operation of the protocol manager 612, the calibration fit manager 618, and the analysis manager 620 in separate locations. Thus, a technician operating an assay device 101, via a local assay computing system 102 may store the collected calibration assay data and sample assay data in any storage device associated with the assay system environment 100. The calibration fit manager 618 may then be operated on the calibration data and the analysis manager 620 may then be operated on the sample assay data from any other computer system within the assay system environment 100.

Accordingly, various workflow scenarios may be accomplished by the system as described herein. For example, a customer entity may receive multi-well sample plates from a distributor and perform all required calibration, assay, and analysis steps. In another example, a customer entity may receive multi-well sample plates for which calibration steps have already been completed. Thus, in addition to receiving the sample plates, the customer entity may receive associated calibration information. In another example, calibration assay and sample assay steps may be formed by a first party, while a second party performs calibration fitting and sample quantity value determination steps. In still another example, a customer entity may perform calibration assay and sample assay steps and may receive calibration information from a second party based on the calibration assay data sets. The foregoing are examples only and do not limit the scope of this disclosure. The use of the assay system environment 100 permits the operation of any steps described herein at any suitable location.

Figure 16:
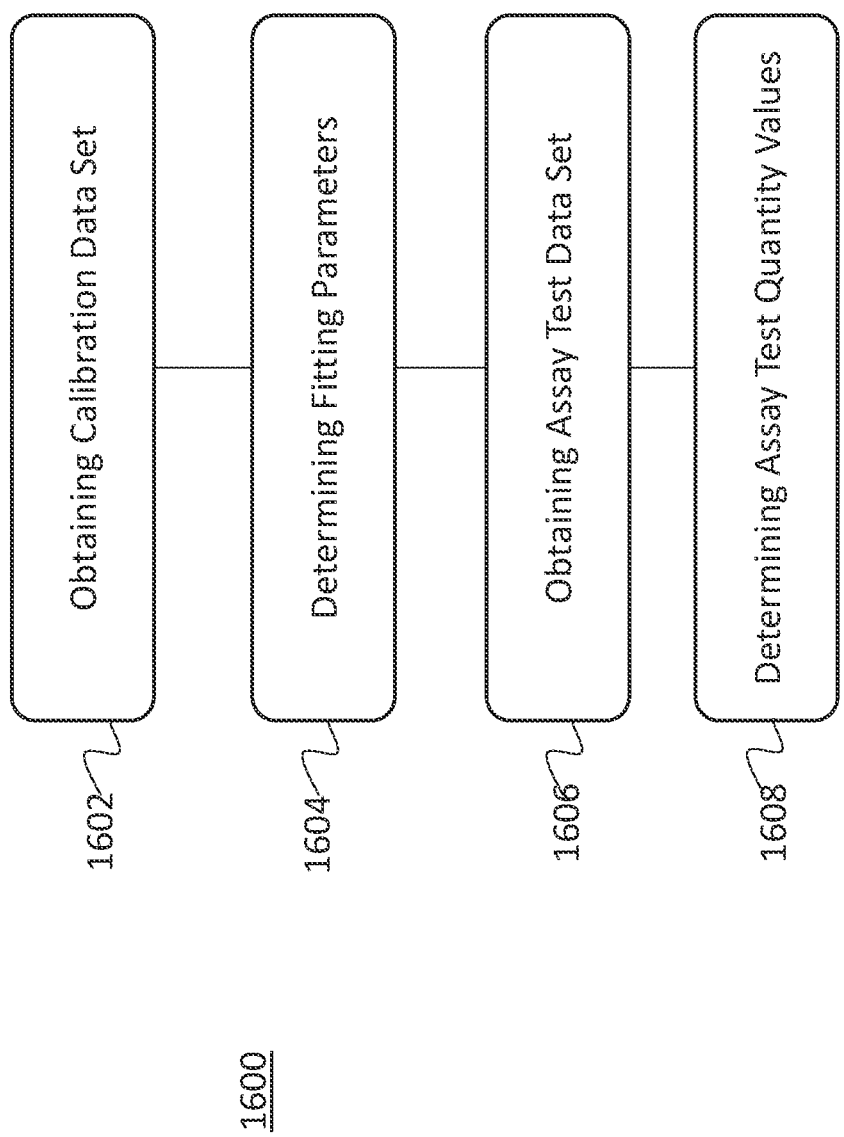
FIG. 16 illustrates a process of calibrating an assay system and applying calibration values according to embodiments hereof.

FIG. 16 is a flow chart showing a process 1600 of calibrating an assay and applying the calibration to sample assay data. The process 1600 is performed on one or more computer systems having one or more physical processors programmed with computer program instructions that, when executed by the one or more physical processors, cause the computer system to perform the method. In embodiments, the process 1600 is carried out via one or more computing systems 602 associated with the assay system environment 100. The computing system 602 represents an example of a hardware and software combination configured to carry out process 1600, but implementations of the process 1600 are not limited to the hardware and software combination of the computing system 602. Additional details regarding each of the operations of the method may be understood according to the description the computing system 602, as described above.

In an operation 1602 of process 1600, a computing system (e.g., 602) obtains a calibration data set. Obtaining a calibration data set may be performed by, e.g., a calibration fit manager 618 associated with the assay system environment 100 and/or by a calibration fit manager 618 in conjunction with a protocol manager 612 associated with the assay system environment 100. Obtaining a calibration data set may include performing calibration assays to generate a calibration data set using one or more assay devices 101 associated with the assay system environment 100. Obtaining a calibration data set may alternatively or additionally include retrieving a calibration data set from any storage location (e.g., data storage device 106) associated with the assay system environment 100. The calibration data set includes a plurality of quantity values based on defined quantity values of a plurality of calibration samples and includes a plurality of assay signal values corresponding to the plurality of calibration samples.

In an operation 1604 or process 1600, a computing system determines fitting parameters of a model calibration equation. Determining fitting parameters of a model calibration equation may be performed by, e.g., any calibration fit manager 618 associated with the assay system environment. Determining the fitting parameters may include selection of a calibration model equation and fitting the parameters to the calibration model equation. Fitting the parameters to the calibration model equation includes fitting the dependence of a plurality of assay signal values from the calibration data set on the plurality of quantity values of the calibration data set to the calibration model equation. The selected calibration model equation and associated fitting parameters make up a calibration model. For example, the calibration fit manager 618 may determine respective values for the fitting parameters discussed above (e.g., A, B, C, D) which minimizes an amount of error between analyte quantity values predicted or estimated by the calibration model and known analyte quantity values for the calibration samples.

In an operation 1606 of process 1600, a computing system may obtain a sample assay data set. Obtaining a sample assay data set may include performing a sample assay at an assay device 101 associated with the assay system environment 100 by, e.g., a protocol manager 612 associated with the assay system environment 100 to generate the sample assay data set. Obtaining a sample assay data set may additionally or alternatively include retrieving, by the analysis manager 620, the sample assay data set from any storage location associated with the assay system environment 100.

In an operation 1608 of process 1600, a computing system may determine sample assay quantity values. Sample assay quantity values are determined by, e.g., the analysis manager 620 according to the sample assay data set and the calibration model—i.e., the selected model calibration equation and the fitting parameter values from operation 1604. In embodiments, the inverse form of the selected model calibration equation is employed to facilitate determination of the sample assay quantity values. In embodiments, the analysis manager employs and equation-solving algorithm to determine the sample assay quantity values.

The operations of the process 1600 may be performed by various managers associated with computing systems (local and networked) of the assay system environment 100. The various operations of the process 1600 may be performed at any one or more of the computing systems associated with the assay system environment 100 and there is no requirement that any of the operations be executed at the same computing system.

Additional embodiments include the following.

Embodiment 1 is an assay system calibration method comprising: performing, on an assay system, a plurality of calibration assays on a plurality of calibration samples having defined quantities of an analyte and including calibration samples having different quantities of the analyte to obtain a plurality of calibration assay signal values; generating, by at least one processing unit, a calibration data set including a plurality of quantity values according to the defined quantities and the plurality of calibration assay signal values corresponding to the plurality of calibration samples; selecting, by the at least one processing unit, a calibration model equation relating the defined quantities to the plurality of calibration assay signal values, wherein the calibration model equation is a modified four parameter logistic regression fit equation with a modified Hill's slope that is dependent on a function of a quantity value; identifying, by the at least one processing unit, respective values for fitting parameters that fit the calibration model equation to the calibration data set; generating, by the at least one processing unit, a calibration model including the calibration model equation and the respective values for the fitting parameters; performing, on the assay system, at least one sample assay on at least one test sample to obtain at least one sample assay signal value; generating, by the at least one processing unit, a sample assay data set including the at least one sample assay signal value; and obtaining, by the at least one processing unit, a sample quantity value determined according to the calibration model and the at least one sample assay signal value.

Embodiment 2 includes embodiment 1, wherein, in the calibration model equation, the modified Hill's slope is dependent on a function of an inverse of the quantity value.

Embodiment 3 includes embodiment 2, wherein the calibration model equation is defined as:

$$y = A + \frac{B - A}{1 + (C/x)^{D+E\left(\frac{C}{x}\right)}}$$

or a mathematical equivalent, wherein, x represents the quantity value, y represents an assay signal value, and A, B, C, D, and E are fitting parameters.

Embodiment 4 includes embodiments 1-3, wherein, in the calibration model equation, the modified Hill's slope is dependent on a function of a natural logarithm of an inverse of the quantity value.

Embodiment 5 includes embodiments 1-4, wherein the calibration model equation is defined as:

$$y = A + \frac{B - A}{1 + (C/x)^{D+E\ln C/x}}$$

wherein, x represents the quantity value, y represents an assay signal value, and A, B, C, D, and E are fitting parameters.

Embodiment 6 includes embodiments 1-5, wherein obtaining the sample quantity value according to the calibration model is performed using an equation $$x = C * e^{\left[\dfrac{D - \sqrt{D^2 + 4E\ln\left(\dfrac{B-A}{y-A} - 1\right)}}{2E}\right]}.$$

Embodiment 7 includes embodiments 1-6, wherein the calibration model equation is defined as:

$$y = A + B(x/C)^{D + E\ln\left(\dfrac{x}{C}\right)}$$

wherein, x represents the quantity value, y represents an assay signal value, C represents a selected constant, and A, B, D, and E are fitting parameters.

Embodiment 8 includes embodiments 1-7, wherein the calibration model equation is defined as:

$$y = A + B(x/C)^{D + E\left(\dfrac{x}{C}\right)}$$

wherein, x represents the quantity value, y represents an assay signal value, C represents a selected constant, and A, B, D, and E are fitting parameters.

Embodiment 9 includes embodiments 1-8, wherein identifying respective values for the fitting parameters includes determining the respective values of the fitting parameters that minimize a mean square error of the calibration data set and one or more estimates or predictions obtained from the calibration model.

Embodiment 10 includes embodiments 1-10, wherein the mean square error is calculated using a $1/y^2$ model.

Embodiment 11 is an assay system including: at least one memory unit; at least one processing unit programmed according to instructions on the at least one memory unit; and at least one assay system component configured to be controlled by the at least one processing unit, wherein the at least one processing unit is configured to: control the at least one assay system component to perform a plurality of calibration assays on a plurality of calibration samples having defined quantities of an analyte and including calibration samples having different quantities of the analyte to obtain a plurality of calibration assay signal values; generate a calibration data set including a plurality of quantity values according to the defined quantities and the plurality of calibration assay signal values corresponding to the plurality of calibration samples; select a calibration model equation relating the defined quantities to the plurality of calibration assay signal values, wherein the calibration model equation is a modified four parameter logistic regression fit equation where a modified Hill's slope is dependent on a function of a quantity value; identify respective values for fitting parameters that fit the calibration model equation to the calibration data set; generate a calibration model including the calibration model equation and the respective values for the fitting parameters; control the at least one assay system component to perform at least one sample assay on at least one test sample to obtain at least one sample assay signal value; generate a sample assay data set including the at least one sample assay signal value; and obtain a sample quantity value determined according to the calibration model and the at least one sample assay signal value.

Embodiment 12 includes embodiment 11, wherein, in the calibration model equation, the modified Hill's slope is dependent on a function of an inverse of the quantity value.

Embodiment 13 includes embodiments 11-12, wherein the calibration model equation is defined as:

$$y = A + \dfrac{B - A}{1 + (C/x)^{D + E\left(\dfrac{C}{x}\right)}}$$

wherein, x represents a quantity value, y represents an assay signal value, and A, B, C, D, and E are fitting parameters.

Embodiment 14 includes embodiments 11-13, wherein, in the calibration model equation, the modified Hill's slope is dependent on a function of a natural logarithm of an inverse of the quantity value.

Embodiment 15 includes embodiments 11-14, wherein the calibration model equation is defined as:

$$y = A + \dfrac{B - A}{1 + (C/x)^{D + E\ln C/x}}$$

wherein, x represents the quantity value, y represents an assay signal value, and A, B, C, D, and E are fitting parameters.

Embodiment 16 includes embodiments 11-15, wherein obtaining the sample quantity value according to the calibration model is performed using an equation $$x = C * e^{\left[\dfrac{D - \sqrt{D^2 + 4E\ln\left(\dfrac{B-A}{y-A} - 1\right)}}{2E}\right]}.$$

Embodiment 17 includes embodiments 11-16, wherein the calibration model equation is defined as:

$$y = A + B(x/C)^{D + E\ln\left(\dfrac{x}{C}\right)}$$

wherein, x represents the quantity value, y represents an assay signal value, C represents a selected constant, and A, B, D, and E are fitting parameters.

Embodiment 18 includes embodiments 11-17 wherein the calibration model equation is defined as:

$$y = A + B(x/C)^{D + E\left(\dfrac{x}{C}\right)}$$

wherein, x represents the quantity value, y represents an assay signal value, C represents a selected constant, and A, B, D, and E are fitting parameters.

Embodiment 19 includes embodiments 11-18 wherein the at least one processing unit is further configured to identify the respective values for the fitting parameters by determining the respective values of the fitting parameters that minimize a mean square error between the calibration data set and one or more estimates or predictions obtained from the calibration model.

Embodiment 20 includes embodiments 11-19, wherein the mean square error is calculated using a $1/y^2$ model.

Embodiment 20 includes one or more non-transitory computer-readable media having instructions stored thereon that, when executed by at least one processing unit, cause the at least one processing unit to: perform, via control of an assay system, a plurality of calibration assays on a plurality of calibration samples having defined quantities of an analyte and including calibration samples having different quantities of the analyte to obtain a plurality of calibration assay signal values; generate a calibration data set including a plurality of quantity values according to the defined quantities and the plurality of calibration assay signal values corresponding to the plurality of calibration samples; select a calibration model equation relating the defined quantities to the plurality of calibration assay signal values, wherein the calibration model equation is a modified four parameter logistic regression fit equation where a modified Hill's slope is dependent on a function of a quantity value; identify respective values for fitting parameters that fit the calibration model equation to the calibration data set; generate a calibration model including the calibration model equation and the respective values for the fitting parameters; perform, via control of the assay system, at least one sample assay on at least one test sample to obtain at least one sample assay signal value; generate a sample assay data set including the at least one sample assay signal value; and obtain a sample quantity value determined according to the calibration model and the at least one sample assay signal value.

Embodiment 22 includes embodiment 21, wherein, in the calibration model equation, the modified Hill's slope is dependent on a function of an inverse of the quantity value.

Embodiment 23 includes embodiments 21-22, wherein the calibration model equation is defined as:

$$y = A + \frac{B-A}{1+(C/x)^{D+E\left(\frac{C}{x}\right)}}$$

wherein, x represents a quantity value, y represents an assay signal value, and A, B, C, D and E are fitting parameters.

Embodiment 24 includes embodiments 21-23, wherein, in the calibration model equation, the modified Hill's slope is dependent on a function of a natural logarithm of an inverse of the quantity value.

Embodiment 25 includes embodiments 21-24, wherein the calibration model equation is defined as:

$$y = A + \frac{B-A}{1+(C/x)^{D+E\ln C/x}}$$

wherein, x represents the quantity value, y represents an assay signal value, and A, B, C, D and E are fitting parameters.

Embodiment 26 includes embodiments 21-25, wherein obtaining the sample quantity value according to the calibration model is performed using an equation $$x = C*e^{\left[\frac{D-D^2+4E\ln\left(\frac{B-A}{y-A}-1\right)}{2E}\right]}.$$

Embodiment 27 includes embodiments 21-26, wherein the calibration model equation is defined as:

$$y = A + B(x/C)^{D+E\ln\left(\frac{x}{C}\right)}$$

wherein, x represents the quantity value, y represents an assay signal value, C represents a selected constant, and A, B, D, and E are fitting parameters.

Embodiment 28 includes embodiments 21-27, wherein the calibration model equation is defined as:

$$y = A + B(x/C)^{D+E\left(\frac{x}{C}\right)}$$

wherein, x represents the quantity value, y represents an assay signal value, C represents a selected constant, and A, B, D, and E are fitting parameters.

Embodiment 29 includes embodiments 21-28, wherein the at least one processing unit is caused to identify the respective values for the fitting parameters by determining the respective values of the fitting parameters that minimize a mean square error between the calibration data set and one or more estimates or predictions obtained from the calibration model.

Embodiment 30 includes embodiments 21-29, wherein the mean square error is calculated using a $1/y^2$ model.

Embodiment 31 includes an assay system calibration method comprising: performing, on an assay system, a plurality of calibration assays on a plurality of calibration samples having defined quantities of an analyte and including calibration samples having different quantities of the analyte to obtain a plurality of calibration assay signal values; generating, by at least one processing unit, a calibration data set including a plurality of quantity values according to the defined quantities and the plurality of calibration assay signal values corresponding to the plurality of calibration samples; selecting, by the at least one processing unit, a calibration model equation relating the defined quantities to the plurality of calibration assay signal values, wherein the calibration model equation is a modified four parameter logistic regression fit equation where a modified Hill's slope is dependent on a function of a quantity value; identifying, by the at least one processing unit, respective values for fitting parameters that fit the calibration model equation to the calibration data set; generating, by the at least one processing unit, a calibration model including the calibration model equation and the fitting parameters; and storing, by the at least one processing unit, the calibration model.

Embodiment 32 includes embodiment 31, wherein, in the calibration model equation, the modified Hill's slope is dependent on a function of an inverse of the quantity value.

Embodiment 33 includes embodiments 31-32, wherein the calibration model equation is defined as:

$$y = A + \frac{B-A}{1+(C/x)^{D+E\left(\frac{C}{x}\right)}}$$

wherein, x represents a quantity value, y represents an assay signal value, and A, B, C, D and E are fitting parameters.

Embodiment 34 includes embodiments 31-34, wherein, in the calibration model equation, the modified Hill's slope is dependent on a function of a natural logarithm of an inverse of the quantity value.

Embodiment 35 includes embodiments 31-34, wherein the calibration model equation is defined as:

$$y = A + \frac{B-A}{1 + (C/x)^{D+E\ln C/x}}$$

wherein, x represents the quantity value, y represents an assay signal value, and A, B, C, D, and E are fitting parameters.

Embodiment 36 includes embodiments 31-35, wherein obtaining a sample quantity value according to the calibration model is performed using an equation $$x = C * e^{\left[\frac{D - \sqrt{D^2 + 4E\ln\left(\frac{B-A}{y-A} - 1\right)}}{2E}\right]}.$$

Embodiment 37 includes embodiments 31-36, wherein the calibration model equation is defined as:

$$y = A + B(x/C)^{D+E\ln\left(\frac{x}{C}\right)}$$

wherein, x represents the quantity value, y represents an assay signal value, C represents a selected constant, and A, B, D, and E are fitting parameters.

Embodiment 38 includes embodiments 31-37, wherein the calibration model equation is defined as:

$$y = A + B(x/C)^{D+E\left(\frac{x}{C}\right)}$$

wherein, x represents the quantity value, y represents an assay signal value, C represents a selected constant, and A, B, D, and E are fitting parameters.

Embodiment 39 includes embodiments 31-38, wherein identifying the respective values for the fitting parameters includes determining the respective values of the fitting parameters that minimize a mean square error between the calibration data set and one or more estimates or predictions obtained from the calibration model.

Embodiment 40 includes embodiments 31-39, wherein the mean square error is calculated using a $1/y^2$ model.

Embodiment 41 includes an assay system calibration method comprising: obtaining, by at least one processing unit: a calibration model including a calibration model equation and respective values for fitting parameters, wherein the calibration model equation relates defined quantities to a plurality of calibration assay signal values and is a modified four parameter logistic regression fit equation where a modified Hill's slope is dependent on a function of a quantity value, and the respective values for the fitting parameters fit the calibration model equation to a calibration data set including a plurality of quantity values according to the defined quantities and the plurality of calibration assay signal values corresponding to a plurality of calibration samples; performing, on an assay system, at least one sample assay on at least one test sample to obtain a sample assay signal value; generating, by the at least one processing unit, a sample assay data set including the sample assay signal value; and determining, by the at least one processing unit, a sample quantity value determined according to the calibration model and the at least one sample assay signal value.

Embodiment 42 includes embodiment 41, wherein, in the calibration model equation, the modified Hill's slope is dependent on a function of an inverse of the quantity value.

Embodiment 43 includes embodiments 41-42, wherein the calibration model equation is defined as:

$$y = A + \frac{B-A}{1 + (C/x)^{D+E\left(\frac{C}{x}\right)}}$$

wherein, x represents a quantity value, y represents an assay signal value, and A, B, C, D, and E are fitting parameters.

Embodiment 44 includes embodiments 41-43, wherein, in the calibration model equation, the modified Hill's slope is dependent on a function of a natural logarithm of an inverse of the quantity value.

Embodiment 45 includes embodiments 41-44, wherein the calibration model equation is defined as:

$$y = A + \frac{B-A}{1 + (C/x)^{D+E\ln C/x}}$$

wherein, x represents the quantity value, y represents an assay signal value, and A, B, C, D, and E are fitting parameters.

Embodiment 46 includes embodiments 41-45, wherein obtaining the sample quantity value according to the calibration model is performed using the equation $$x = C * e^{\left[\frac{D - \sqrt{D^2 + 4E\ln\left(\frac{B-A}{y-A} - 1\right)}}{2E}\right]}.$$

Embodiment 47 includes embodiments 41-46, wherein the calibration model equation is defined as:

$$y = A + B(x/C)^{D+E\ln\left(\frac{x}{C}\right)}$$

wherein, x represents the quantity value, y represents an assay signal value, C represents a selected constant, and A, B, D, and E are fitting parameters.

Embodiment 48 includes embodiments 41-47, wherein the calibration model equation is defined as:

$$y = A + B(x/C)^{D+E\left(\frac{x}{C}\right)}$$

wherein, x represents the quantity value, y represents an assay signal value, C represents a selected constant, and A, B, D, and E are fitting parameters.

Embodiment 49 includes embodiments 41-48, wherein identifying the respective values for the fitting parameters includes determining the respective values of the fitting parameters that minimize a mean square error between the calibration data set and one or more estimates or predictions obtained from the calibration model.

Embodiment 50 includes embodiments 41-49, wherein the mean square error is calculated using a $1/y^2$ model.

Embodiment 51 includes one or more non-transitory computer-readable media having instructions stored thereon that, when executed by at least one processing unit, cause the processing unit to: obtain a calibration data set including results of assay measurements on a plurality of calibration samples having defined quantities of an analyte and including calibration samples having different quantities of the analyte, the calibration data set including a plurality of a quantity values according to defined quantities and a plurality of calibration assay signal values corresponding to the plurality of calibration samples; select a calibration model equation relating the defined quantities to the plurality of calibration assay signal values, wherein the calibration model equation is a modified four parameter logistic regression fit equation where a modified Hill's slope is dependent on a function of quantity value; identify respective values of fitting parameters that fit the calibration model equation to the calibration data set; generate a calibration model including the calibration model equation and the respective values of the fitting parameters; obtain a sample assay data set including results of assay measurements on at least one test sample, a test data set including at least one sample assay signal value corresponding to the at least one test sample; and determine a sample quantity value according to the calibration model and the at least one sample assay signal value.

Embodiment 52 includes embodiment 51, wherein, in the calibration model equation, the modified Hill's slope is dependent on a function of an inverse of the quantity value.

Embodiment 53 includes embodiments 51-52, wherein the calibration model equation is defined as:

$$y = A + \frac{B-A}{1+(C/x)^{D+E\left(\frac{C}{x}\right)}}$$

wherein, x represents a quantity value, y represents an assay signal value, and A, B, C, D, and E are fitting parameters.

Embodiment 54 includes embodiments 51-53, wherein, in the calibration model equation, the modified Hill's slope is dependent on a function of a natural logarithm of an inverse of the quantity value.

Embodiment 55 includes embodiments 51-54, wherein the calibration model equation is defined as:

$$y = A + \frac{B-A}{1+(C/x)^{D+ElnC/x}}$$

wherein, x represents the quantity value, y represents an assay signal value, and A, B, C, D, and E are fitting parameters.

Embodiment 56 includes embodiments 51-55, wherein obtaining the sample quantity value according to the calibration model is performed using an equation $$x = C * e^{\left[\frac{D-\sqrt{D^2+4Eln\left(\frac{B-A}{y-A}-1\right)}}{2E}\right]}.$$

Embodiment 57 includes embodiments 51-56, wherein the calibration model equation is defined as:

$$y = A + B(x/C)^{D+Eln\left(\frac{x}{C}\right)}$$

wherein, x represents the quantity value, y represents an assay signal value, C represents a selected constant, and A, B, D, and E are fitting parameters.

Embodiment 58 includes embodiments 51-57, wherein the calibration model equation is defined as:

$$y = A + B(x/C)^{D+E\left(\frac{x}{C}\right)}$$

wherein, x represents the quantity value, y represents an assay signal value, C represents a selected constant, and A, B, D, and E are fitting parameters.

Embodiment 59 includes embodiments 51-58, wherein the at least one processing unit is caused to identify the respective values of the fitting parameters by determining the respective values of the fitting parameters that minimize a mean square error between the calibration data set and one or more estimates or predictions obtained from the calibration model.

Embodiment 60 includes embodiments 51-59, wherein the mean square error is calculated using a $1/y^2$ model.

Embodiment 61 includes a computer-implemented method to be carried out by a system including at least one memory unit and at least one processing unit programmed according to instructions on the at least one memory unit, the method comprising: obtaining, by at least one processing unit: a calibration model including a calibration model equation and respective values for fitting parameters, wherein the calibration model equation relates defined quantities to a plurality of calibration assay signal values and is modified four parameter logistic regression fit equation where a modified Hill's slope is dependent on a function of a quantity value, and the respective values for the fitting parameters fit the calibration model equation to a calibration data set including a plurality of quantity values according to the defined quantities and the plurality of calibration assay signal values corresponding to a plurality of calibration samples; obtaining, by the at least one processing unit, a sample assay data set including results of sample assay measurements on at least one test sample, the sample assay data set including at least one sample assay signal value corresponding to the at least one test sample; and determining, by the at least one processing unit, a sample quantity value according to according to the calibration model and the at least one sample assay signal value.

Embodiment 62 includes embodiment 61, wherein, in the calibration model equation, the modified Hill's slope is dependent on a function of an inverse of the quantity value.

Embodiment 63 includes embodiments 61-62, wherein the calibration model equation is defined as:

$$y = A + \frac{B-A}{1+(C/x)^{D+E\left(\frac{C}{x}\right)}}$$

wherein, x represents a quantity value, y represents an assay signal value, and A, B, C, D, and E are fitting parameters.

Embodiment 64 includes embodiments 61-63, wherein, in the calibration model equation, the modified Hill's slope is dependent on a function of a natural logarithm of an inverse of the quantity value.

Embodiment 65 includes embodiments 61-64, wherein the calibration model equation is defined as:

$$y = A + \frac{B-A}{1+(C/x)^{D+E\ln C/x}}$$

wherein, x represents the quantity value, y represents an assay signal value, and A, B, C, D, and E are fitting parameters.

Embodiment 66 includes embodiments 61-65, wherein obtaining the sample quantity value according to the calibration model is performed using an equation $$x = C*e^{\left[\frac{D-\sqrt{D^2+4E\ln\left(\frac{B-A}{y-A}-1\right)}}{2E}\right]}.$$

Embodiment 67 includes embodiments 61-66, wherein the calibration model equation is defined as:

$$y = A + B(x/C)^{D+E\ln\left(\frac{x}{C}\right)}$$

wherein, x represents the quantity value, y represents an assay signal value, C represents a selected constant, and A, B, D, and E are fitting parameters.

Embodiment 68 includes embodiments 61-67, wherein the calibration model equation is defined as:

$$y = A + B(x/C)^{D+E\left(\frac{x}{C}\right)}$$

wherein, x represents the quantity value, y represents an assay signal value, C represents a selected constant, and A, B, D, and E are fitting parameters.

Embodiment 69 includes embodiments 61-68, wherein identifying the respective values of the fitting parameters includes determining the respective values of the fitting parameters that minimize a mean square error between the calibration data set and one or more estimates or predictions obtained from the calibration model.

Embodiment 70 includes embodiments 61-69, wherein the mean square error is calculated using a $1/y^2$ model.

It will be readily apparent to one of ordinary skill in the relevant arts that other suitable modifications and adaptations to the methods and applications described herein can be made without departing from the scope of any of the embodiments.

It is to be understood that while certain embodiments have been illustrated and described herein, the claims are not to be limited to the specific forms or arrangement of parts described and shown. In the specification, there have been disclosed illustrative embodiments and, although specific terms are employed, they are used in a generic and descriptive sense only and not for purposes of limitation. Modifications and variations of the embodiments are possible in light of the above teachings. It is therefore to be understood that the embodiments may be practiced otherwise than as specifically described.

All publications, patents and patent applications mentioned in this specification are herein incorporated by reference to the same extent as if each individual publication, patent or patent application was specifically and individually indicated to be incorporated by reference.

The invention claimed is:

1. An assay system calibration method comprising:
performing, on an assay system comprising computing systems and assay devices, wherein the assay devices include an assay device configured for conducting luminescence assays in multi-well plates, the assay device comprising:
a light detection system,
a plate handling system, and
a housing;
a plurality of calibration assays on a plurality of calibration samples having defined quantities of an analyte and including calibration samples having different quantities of the analyte to obtain a plurality of calibration assay signal values;
generating, by at least one processing unit, a calibration data set including a plurality of quantity values according to the defined quantities and the plurality of calibration assay signal values corresponding to the plurality of calibration samples;
selecting, by the at least one processing unit, a calibration model equation employed to model analyte detection response, the calibration model equation relating the defined quantities to the plurality of calibration assay signal values, wherein the calibration model equation is a modified four parameter logistic regression fit equation with a modified Hill's slope that is dependent on a function of a quantity value;
identifying, by the at least one processing unit, respective values for fitting parameters that fit the calibration model equation to the calibration data set;
generating, by the at least one processing unit, a calibration model including the calibration model equation and the respective values for the fitting parameters;
performing, on the assay system, at least one sample assay on at least one test sample to obtain at least one sample assay signal value;
generating, by the at least one processing unit, a sample assay data set including the at least one sample assay signal value; and
obtaining, by the at least one processing unit, a sample quantity value determined according to the calibration model and the at least one sample assay signal value.

2. The assay system calibration method of claim 1, wherein, in the calibration model equation, the modified Hill's slope is dependent on a function of an inverse of the quantity value.

3. The assay system calibration method of claim 2, wherein the calibration model equation is defined as:

$$y = A + \frac{B-A}{1+(C/x)^{D+E\left(\frac{C}{x}\right)}}$$

or a mathematical equivalent,
wherein, x represents the quantity value, y represents an assay signal value, and A, B, C, D, and E are fitting parameters.

4. The assay system calibration method of claim 1, wherein, in the calibration model equation, the modified Hill's slope is dependent on a function of a natural logarithm of an inverse of the quantity value.

5. The assay system calibration method of claim 4, wherein the calibration model equation is defined as:

$$y = A + \frac{B-A}{1+(C/x)^{D+E\ln C/x}}$$

wherein, x represents the quantity value, y represents an assay signal value, and A, B, C, D, and E are fitting parameters.

6. The assay system calibration method of claim 5, wherein obtaining the sample quantity value according to the calibration model is performed using an equation $$x = C*e^{\left[\frac{D - \sqrt{D^2 + 4E\ln\left(\frac{B-A}{y-A} - 1\right)}}{2E}\right]}.$$

7. The assay system calibration method of claim 1, wherein the calibration model equation is defined as:

$$y = A + B(x/C)^{D+E\ln\left(\frac{x}{C}\right)}$$

wherein, x represents the quantity value, y represents an assay signal value, C represents a selected constant, and A, B, D, and E are fitting parameters.

8. The assay system calibration method of claim 1, wherein the calibration model equation is defined as:

$$y = A + B(x/C)^{D+E\left(\frac{x}{C}\right)}$$

wherein, x represents the quantity value, y represents an assay signal value, C represents a selected constant, and A, B, D, and E are fitting parameters.

9. The assay system calibration method of claim 1, wherein identifying respective values for the fitting parameters includes determining the respective values of the fitting parameters that minimize a mean square error of the calibration data set and one or more estimates or predictions obtained from the calibration model.

10. The assay system calibration method of claim 9, wherein the mean square error is calculated using a $1/y^2$ model.

11. An assay system comprising computing systems and assay devices, wherein the assay devices include an assay device configured for conducting luminescence assays in multi-well plates, the assay device comprising:
   a light detection system,
   a plate handling system, and
   a housing;
   the computing systems including:
   at least one memory unit;
   at least one processing unit programmed according to instructions on the at least one memory unit; and
   at least one assay system component configured to be controlled by the at least one processing unit, wherein the at least one processing unit is configured to:
   control the at least one assay system component to perform a plurality of calibration assays on a plurality of calibration samples having defined quantities of an analyte and including calibration samples having different quantities of the analyte to obtain a plurality of calibration assay signal values;
   generate a calibration data set including a plurality of quantity values according to the defined quantities and the plurality of calibration assay signal values corresponding to the plurality of calibration samples;
   select a calibration model equation employed to model analyte detection response, the calibration model equation relating the defined quantities to the plurality of calibration assay signal values, wherein the calibration model equation is a modified four parameter logistic regression fit equation where a modified Hill's slope is dependent on a function of a quantity value;
   identify respective values for fitting parameters that fit the calibration model equation to the calibration data set;
   generate a calibration model including the calibration model equation and the respective values for the fitting parameters;
   control the at least one assay system component to perform at least one sample assay on at least one test sample to obtain at least one sample assay signal value;
   generate a sample assay data set including the at least one sample assay signal value; and
   obtain a sample quantity value determined according to the calibration model and the at least one sample assay signal value.

12. The assay system of claim 11, wherein, in the calibration model equation, the modified Hill's slope is dependent on a function of an inverse of the quantity value.

13. The assay system of claim 12, wherein the calibration model equation is defined as:

$$y = A + \frac{B-A}{1+(C/x)^{D+E\left(\frac{C}{x}\right)}}$$

wherein, x represents a quantity value, y represents an assay signal value, and A, B, C, D, and E are fitting parameters.

14. The assay system of claim 11, wherein, in the calibration model equation, the modified Hill's slope is dependent on a function of a natural logarithm of an inverse of the quantity value.

15. The assay system of claim 14, wherein the calibration model equation is defined as:

$$y = A + \frac{B-A}{1+(C/x)^{D+E\ln C/x}}$$

wherein, x represents the quantity value, y represents an assay signal value, and A, B, C, D, and E are fitting parameters.

16. The assay system of claim 15, wherein obtaining the sample quantity value according to the calibration model is performed using an equation $$x = C*e^{\left[\frac{D - \sqrt{D^2 + 4E\ln\left(\frac{B-A}{y-A} - 1\right)}}{2E}\right]}.$$

17. The assay system of claim 11, wherein the calibration model equation is defined as:

$$y = A + B(x/C)^{D+E\ln(\frac{x}{C})}$$

wherein, x represents the quantity value, y represents an assay signal value, C represents a selected constant, and A, B, D, and E are fitting parameters.

18. The assay system of claim 11, wherein the calibration model equation is defined as:

$$y = A + B(x/C)^{D+E(\frac{x}{C})}$$

wherein, x represents the quantity value, y represents an assay signal value, C represents a selected constant, and A, B, D, and E are fitting parameters.

19. The assay system of claim 11, wherein the at least one processing unit is further configured to identify the respective values for the fitting parameters by determining the respective values of the fitting parameters that minimize a mean square error between the calibration data set and one or more estimates or predictions obtained from the calibration model.

20. The assay system of claim 19, wherein the mean square error is calculated using a $1/y^2$ model.

21. One or more non-transitory computer-readable media having instructions stored thereon that, when executed by at least one processing unit, cause the at least one processing unit to:
  perform, via control of an assay system comprising computing systems and assay devices, wherein the assay devices include an assay device configured for conducting luminescence assays in multi-well plates, the assay device comprising:
    a light detection system,
    a plate handling system, and
    a housing;
    a plurality of calibration assays on a plurality of calibration samples having defined quantities of an analyte and including calibration samples having different quantities of the analyte to obtain a plurality of calibration assay signal values;
  generate a calibration data set including a plurality of quantity values according to the defined quantities and the plurality of calibration assay signal values corresponding to the plurality of calibration samples;
  select a calibration model equation employed to model analyte detection response, the calibration model equation relating the defined quantities to the plurality of calibration assay signal values, wherein the calibration model equation is a modified four parameter logistic regression fit equation where a modified Hill's slope is dependent on a function of a quantity value;
  identify respective values for fitting parameters that fit the calibration model equation to the calibration data set;
  generate a calibration model including the calibration model equation and the respective values for the fitting parameters;
  perform, via control of the assay system, at least one sample assay on at least one test sample to obtain at least one sample assay signal value;
  generate a sample assay data set including the at least one sample assay signal value; and
  obtain a sample quantity value determined according to the calibration model and the at least one sample assay signal value.

22. An assay system calibration method comprising:
  performing, on an assay system comprising computing systems and assay devices, wherein the assay devices include an assay device configured for conducting luminescence assays in multi-well plates, the assay device comprising:
    a light detection system,
    a plate handling system, and
    a housing;
    a plurality of calibration assays on a plurality of calibration samples having defined quantities of an analyte and including calibration samples having different quantities of the analyte to obtain a plurality of calibration assay signal values;
  generating, by at least one processing unit, a calibration data set including a plurality of quantity values according to the defined quantities and the plurality of calibration assay signal values corresponding to the plurality of calibration samples;
  selecting, by the at least one processing unit, a calibration model equation employed to model analyte detection response, the calibration model equation relating the defined quantities to the plurality of calibration assay signal values, wherein the calibration model equation is a modified four parameter logistic regression fit equation where a modified Hill's slope is dependent on a function of a quantity value;
  identifying, by the at least one processing unit, respective values for fitting parameters that fit the calibration model equation to the calibration data set;
  generating, by the at least one processing unit, a calibration model including the calibration model equation and the fitting parameters; and
  storing, by the at least one processing unit, the calibration model.

23. An assay system calibration method comprising:
  obtaining, by at least one processing unit: a calibration model including a calibration model equation employed to model analyte detection response, and respective values for fitting parameters, wherein the calibration model equation relates defined quantities to a plurality of calibration assay signal values and is a modified four parameter logistic regression fit equation where a modified Hill's slope is dependent on a function of a quantity value, and
  the respective values for the fitting parameters fit the calibration model equation to a calibration data set including a plurality of quantity values according to the defined quantities and the plurality of calibration assay signal values corresponding to a plurality of calibration samples;
  performing, on an assay system comprising computing systems and assay devices, wherein the assay devices include an assay device configured for conducting luminescence assays in multi-well plates, the assay device comprising:
    a light detection system,
    a plate handling system, and
    a housing;

at least one sample assay on at least one test sample to obtain a sample assay signal value;

generating, by the at least one processing unit, a sample assay data set including the sample assay signal value; and determining, by the at least one processing unit, a sample quantity value determined according to the calibration model and the at least one sample assay signal value.

24. One or more non-transitory computer-readable media having instructions stored thereon that, when executed by at least one processing unit, cause the processing unit to:

obtain a calibration data set including results of assay measurements on a plurality of calibration samples having defined quantities of an analyte and including calibration samples having different quantities of the analyte, the calibration data set including a plurality of quantity values according to defined quantities and a plurality of calibration assay signal values corresponding to the plurality of calibration samples;

select a calibration model equation employed to model analyte detection response, the calibration model equation relating the defined quantities to the plurality of calibration assay signal values, wherein the calibration model equation is a modified four parameter logistic regression fit equation where a modified Hill's slope is dependent on a function of quantity value;

identify respective values of fitting parameters that fit the calibration model equation to the calibration data set;

generate a calibration model including the calibration model equation and the respective values of the fitting parameters;

obtain a sample assay data set including results of assay measurements on at least one test sample, the sample assay data set including at least one sample assay signal value corresponding to the at least one test sample;

and determine a sample quantity value according to the calibration model and the at least one sample assay signal value;

wherein the assay measurements are performed by assay devices including an assay device configured for conducting luminescence assays in multi-well plates, the assay device comprising:

a light detection system, a plate handling system, and a housing.

25. A computer-implemented method to be carried out by a system including at least one memory unit and at least one processing unit programmed according to instructions on the at least one memory unit, the method comprising:

obtaining, by the at least one processing unit: a calibration model including a calibration model equation employed to model analyte detection response, and respective values for fitting parameters, wherein the calibration model equation relates defined quantities to a plurality of calibration assay signal values and is a modified four parameter logistic regression fit equation where a modified Hill's slope is dependent on a function of a quantity value, and the respective values for the fitting parameters fit the calibration model equation to a calibration data set including a plurality of quantity values according to the defined quantities and the plurality of calibration assay signal values corresponding to a plurality of calibration samples;

obtaining, by the at least one processing unit, a sample assay data set including results of sample assay measurements on at least one test sample, the sample assay data set including at least one sample assay signal value corresponding to the at least one test sample; and determining, by the at least one processing unit, a sample quantity value according to the calibration model and the at least one sample assay signal value;

wherein the sample assay measurements are performed by assay devices including an assay device configured for conducting luminescence assays in multi-well plates, the assay device comprising:

a light detection system, a plate handling system, and a housing.

* * * * *